United States Patent
Ishida et al.

(10) Patent No.: US 10,563,877 B2
(45) Date of Patent: Feb. 18, 2020

(54) AIR CONDITIONER

(71) Applicant: DAIKIN INDUSTRIES, LTD., Osaka-shi, Osaka (JP)

(72) Inventors: Yuko Ishida, Sakai (JP); Yukako Kanazawa, Sakai (JP); Junichi Shimoda, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 228 days.

(21) Appl. No.: 14/940,208

(22) Filed: Nov. 13, 2015

(65) Prior Publication Data

US 2016/0320110 A1 Nov. 3, 2016

Related U.S. Application Data

(63) Continuation-in-part of application No. 14/700,640, filed on Apr. 30, 2015.

(51) Int. Cl.
*F24F 11/30* (2018.01)
*F24F 110/00* (2018.01)
(Continued)

(52) U.S. Cl.
CPC ............ *F24F 11/30* (2018.01); *F24F 11/41* (2018.01); *F24F 11/42* (2018.01);
(Continued)

(58) Field of Classification Search
CPC ............. F25B 2600/0251; F25B 13/00; F25B 2600/2513; F25B 2313/006;
(Continued)

(56) References Cited

U.S. PATENT DOCUMENTS

| 5,799,869 A * | 9/1998 | Pichotta ............ B60H 1/00828 165/269 |
| 2009/0013700 A1* | 1/2009 | Unezaki ................. F25B 9/008 62/77 |

(Continued)

FOREIGN PATENT DOCUMENTS

JP 2009299986 A * 12/2009 ............. F25B 13/00

OTHER PUBLICATIONS

English Translation of JP2009299986A.*

*Primary Examiner* — Marc E Norman
*Assistant Examiner* — Schyler S Sanks
(74) *Attorney, Agent, or Firm* — Global IP Counselors, LLP

(57) ABSTRACT

In an air conditioner, a control section controls at least the indoor expansion valve. The indoor expansion valve has a degree of opening that is controllable. The control section has a condensate formation suppressing control mode and a normal heating control mode. The condensate formation suppressing control mode is performed in a case where a predetermined condensate formation condition is satisfied. The predetermined condensate formation condition relates to generation of condensate formation on the connecting section. The normal heating control mode is performed in cases other than the case where the predetermined condensate formation condition is satisfied. The control section increases the opening degree of the indoor expansion valve when the condensate formation suppressing control mode is performed compared to a case when the normal heating control mode is performed.

21 Claims, 17 Drawing Sheets

(51) Int. Cl.
*F24F 110/10* (2018.01)
*F24F 110/12* (2018.01)
*F24F 140/12* (2018.01)
*F24F 140/20* (2018.01)
*F24F 11/41* (2018.01)
*F24F 11/42* (2018.01)

(52) U.S. Cl.
CPC ....... *F24F 2110/00* (2018.01); *F24F 2110/10* (2018.01); *F24F 2110/12* (2018.01); *F24F 2140/12* (2018.01); *F24F 2140/20* (2018.01)

(58) Field of Classification Search
CPC .... F25B 2600/2503; F25B 2700/21163; F25B 2700/2106; F25B 2341/0662; F24F 13/22; F24F 2013/221
USPC .......................................................... 62/150
See application file for complete search history.

(56) References Cited

U.S. PATENT DOCUMENTS

| | | | |
|---|---|---|---|
| 2010/0024454 A1* | 2/2010 | Kawano | F25B 13/00 62/222 |
| 2010/0192624 A1* | 8/2010 | Teraki | F24F 11/0079 62/527 |
| 2011/0203300 A1 | 8/2011 | Rafalovich | |
| 2013/0118197 A1* | 5/2013 | Kibo | F25B 1/00 62/222 |
| 2014/0196491 A1* | 7/2014 | Zuili | G06F 1/206 62/115 |
| 2014/0373564 A1* | 12/2014 | Nishimura | F25B 1/005 62/222 |
| 2016/0298883 A1* | 10/2016 | Louvar | H05K 7/20827 |

* cited by examiner

AIR CONDITIONER

CROSS-REFERENCE TO RELATED APPLICATION

This is a Continuation in part of U.S. patent application Ser. No. 14/700,640, filed on Apr. 30, 2015.

TECHNICAL FIELD

The present invention relates to an air conditioner.

BACKGROUND ART

In the background art, an air conditioner is used with a configuration where a compressor, an indoor heat exchanger, and an outdoor heat exchanger are connected with each other.

An air conditioner, where using of an expansion valve changes during cooling operation and during heating operation as described in, for example, US 2011/0203300 A1, is proposed as this type of air conditioner. In this air conditioner, reducing of pressure of refrigerant is performed in an indoor expansion valve which sends refrigerant to the indoor side and is provided in front of an indoor heat exchanger without reducing of pressure of refrigerant being performed at the outlet of an outdoor heat exchanger by an outdoor expansion valve, which is provided at the outlet side of the outdoor heat exchanger, being bypassed during cooling operation. In addition, reducing of pressure of refrigerant is performed in the outdoor expansion valve which sends refrigerant to the outdoor side and is provided in front of the outdoor heat exchanger without reducing of pressure of refrigerant being performed at the outlet of the indoor heat exchanger by the indoor expansion valve, which is provided at the outlet side of the indoor heat exchanger, being bypassed during heating operation.

SUMMARY

Problems to be Solved by the Invention

Here, in the air conditioner in the background art described above, refrigerant, which flows through the outlet of the indoor heat exchanger, flows without passing through the indoor expansion valve due to the indoor expansion valve being bypassed during heat operation. For this reason, it is difficult to adjust the extent of condensation of refrigerant in the indoor heat exchanger.

In contrast to this, it is possible to adjust the extent of condensation of refrigerant in the indoor heat exchanger during heating operation by configuring the air conditioner so that refrigerant, which flows through the outlet of the indoor heat exchanger, passes through the indoor expansion valve during heating operation and by adopting an expansion valve where it is possible to proactively control the valve opening in the indoor expansion valve. Then, for example, it is possible to increase the efficiency of condensation in the indoor heat exchanger by adjusting a degree of subcooling of refrigerant flowing through the outlet of the indoor heat exchanger during heating operation.

However, in a case such as this where the pressure of refrigerant, which flows through the outlet of the indoor heat exchanger during heating operation, is reduced by the indoor expansion valve, there is a concern that there will be condensate formation on the outer surface of refrigerant piping up to the outdoor expansion valve due to environmental conditions in which the air conditioner is used since the temperature of refrigerant is lowered after the refrigerant passes through the indoor expansion valve.

The object of the present invention is carried out in consideration of the points described above and is to propose an air conditioner where it is possible to reduce generation of condensate formation from an indoor expansion valve to an outdoor expansion valve during heating operation even in a case where the pressure of refrigerant, which flows through the outlet of an indoor heat exchanger during heating operation, is reduced by the indoor expansion valve.

Means to Solve the Problems

An air conditioner according to a first aspect has an indoor unit and an outdoor unit. The air conditioner comprises a refrigerant circuit and a control section. The refrigerant circuit has an outdoor expansion valve, an outdoor heat exchanger, a compressor, an indoor expansion valve, an indoor heat exchanger, and a connecting section. It is possible for the refrigerant circuit to at least perform heating operation. The outdoor expansion valve, the outdoor heat exchanger, and the compressor are arranged inside the outdoor unit. The indoor expansion valve and the indoor heat exchanger are arranged inside the indoor unit. The connecting section connects the indoor expansion valve and the outdoor expansion valve. The control section performs controlling of at least the indoor expansion valve. The indoor expansion valve is an expansion valve where it is possible for a degree of opening to be controlled. The control section has a condensate formation suppressing control mode and a normal heating control mode. The control section performs the condensate formation suppressing control mode in a case where a predetermined condensate formation condition, which relates to generation of condensate formation on the connecting section, is satisfied. The control section performs the normal heating control mode in cases other than the case where the predetermined condensate formation condition is satisfied. The control section increases the opening degree of the indoor expansion valve in the condensate formation suppressing control mode compared to a case where the normal heating control mode is performed.

In this air conditioner, an expansion valve, where it is possible for the control section to control the valve opening, is used as the indoor expansion valve. For this reason, it is possible to increase the efficiency of refrigerant condensation in the indoor heat exchanger by adjusting subcooling of refrigerant flowing through the outlet of the indoor heat exchanger during heating operation.

Here, the temperature of refrigerant after having passed through the indoor expansion valve is lowered due to reducing of pressure of refrigerant being performed by the indoor expansion valve compared to a case where reducing of pressure is not performed by the indoor expansion valve. When the temperature of refrigerant which passes through the indoor expansion valve is lowered in this manner, there is a concern that there will be condensate formation on the connecting section, in which refrigerant flows after having passed through the indoor expansion valve, due to the surrounding environmental conditions.

In contrast to this, in this air conditioner, the control section performs the condensate formation suppressing control mode where the opening degree of the indoor expansion valve is increased compared to a case where the normal heating control mode is performed in a case where the predetermined condensate formation condition, which relates to generation of condensate formation on the connecting section, is satisfied. Due to this, it is possible to suppress generation of condensate formation on the connecting section since the extent of the reducing of pressure of refrigerant in the indoor expansion valve is suppressed to be small even in circumstances where the predetermined condensate formation condition is satisfied.

An air conditioner according to a second aspect is the air conditioner according to the first aspect where a first sensor and a second sensor are further provided. The first sensor is a sensor for ascertaining the temperature or pressure of refrigerant flowing between the indoor expansion valve and the outdoor expansion valve. The second sensor is a sensor for ascertaining the temperature of the surroundings of the connection section. The control section determines whether or not the predetermined condensate formation condition is satisfied based on information which is ascertained from the first sensor and the second sensor.

An air conditioner according to a third aspect is the air conditioner according to the second aspect where the connecting section has a portion which extends outdoors. The second sensor is an outdoor air temperature sensor.

In this air conditioner, it is possible to determine whether or not the predetermined condensate formation condition is satisfied by factoring in the possibility that condensate formation will be generated due to changes in outdoor air temperature.

An air conditioner according to a fourth aspect is the air conditioner according to the second aspect where the control section controls the opening degree of the indoor expansion valve in such a way that a degree of subcooling of refrigerant at the outlet of the indoor heat exchanger becomes a predetermined normal subcooling target value in the normal heating control mode.

In this air conditioner, it is possible to maintain the efficiency of condensation in the indoor heat exchanger to be high in a case where the normal heating control mode is executed by setting a predetermined normal subcooling target value where it is possible for the condensation capabilities of the indoor heat exchanger to be increased.

An air conditioner according to a fifth aspect is the air conditioner according to the third aspect where the control section controls the opening degree of the indoor expansion valve in such a way that a degree of subcooling of refrigerant at the outlet of the indoor heat exchanger becomes a predetermined normal subcooling target value in the normal heating control mode.

In this air conditioner, it is possible to maintain the efficiency of condensation in the indoor heat exchanger to be high in a case where the normal heating control mode is executed by setting a predetermined normal subcooling target value where it is possible for the condensation capabilities of the indoor heat exchanger to be increased. Then, it is possible to maintain a state where the normal heating control mode is performed and the efficiency of condensation in the indoor heat exchanger is high until there is a state where the predetermined condensate formation condition, which is determined by factoring in the possibility that condensate formation will be generated due to changes in outdoor air temperature, is satisfied.

An air conditioner according to a sixth aspect is the air conditioner according to the fourth aspect where the control section controls the opening degree of the indoor expansion valve in such a way that the degree of subcooling becomes a condensate formation suppressing subcooling target value in the condensate formation suppressing control mode. The condensate formation suppressing subcooling target value is a subcooling target value which is smaller than the normal subcooling target value in the normal heating control mode. The control section sets the condensate formation suppressing subcooling target value to be smaller as the temperature of refrigerant which is ascertained from the first sensor is lower.

In this air conditioner, subcooling control of the indoor expansion valve is continued by changing the target value to the condensate formation suppressing subcooling target value, which is a subcooling target value which is smaller than the normal subcooling target value in the normal heating control mode, when performing the condensate formation suppressing control mode. Due to this, it is possible to maintain the condensation capabilities of the indoor heat exchanger to a certain extent while suppressing generation of condensate formation. Moreover, since the condensate formation suppressing subcooling target value is set to be smaller as the temperature of refrigerant which is ascertained from the first sensor is lower, it is possible to maintain the condensation capabilities of the indoor heat exchanger to be as high as possible by keeping adjusting of the condensate formation suppressing subcooling target value, which is for suppressing condensate formation, to what is necessary according to the circumstances where it is likely that there will be condensate formation.

An air conditioner according to a seventh aspect is the air conditioner according to the fifth aspect where the control section controls the opening degree of the indoor expansion valve in such a way that the degree of subcooling becomes a condensate formation suppressing subcooling target value in the condensate formation suppressing control mode. The condensate formation suppressing subcooling target value is a subcooling target value which is smaller than the normal subcooling target value in the normal heating control mode. The control section sets the condensate formation suppressing subcooling target value to be smaller as the temperature of refrigerant which is ascertained from the first sensor is lower.

In this air conditioner, subcooling control of the indoor expansion valve is continued by changing the target value to the condensate formation suppressing subcooling target value, which is a subcooling target value which is smaller than the normal subcooling target value in the normal heating control mode, when performing the condensate formation suppressing control mode. Due to this, it is possible to maintain the condensation capabilities of the indoor heat exchanger to a certain extent while suppressing generation of condensate formation. Moreover, since the condensate formation suppressing subcooling target value is set to be smaller as the temperature of refrigerant which is ascertained from the first sensor is lower, it is possible to maintain the condensation capabilities of the indoor heat exchanger to be as high as possible by keeping adjusting of the condensate formation suppressing subcooling target value, which is for suppressing condensate formation, to what is necessary according to the circumstances where it is likely that there will be condensate formation. Moreover, it is possible to maintain a state where the normal heating control mode is performed and the efficiency of condensation in the indoor heat exchange is high until there is a state where the predetermined condensate formation condition, which is determined by factoring in the possibility that condensate formation is generated due to changes in outdoor air temperature, is satisfied.

An air conditioner according to an eighth aspect is the air conditioner according to the third aspect where the control section fully opens the indoor expansion valve in a case where the temperature of refrigerant which is ascertained from the first sensor is lower than a stop reference temperature when performing the condensate formation suppressing control mode. The stop reference temperature is a temperature which is obtained by adding a reference predetermined value to the outdoor air temperature which is ascertained from the second sensor.

In this air conditioner, it is possible for it to be difficult for there to be condensate formation due to the indoor expansion valve being fully open by stopping subcooling control of the indoor expansion valve in a case where there are circumstances where generation of condensate formation is not sufficiently suppressed with only subcooling control of the indoor expansion valve in accordance with the condensate formation suppressing control mode.

An air conditioner according to a ninth aspect is the air conditioner according to the eighth aspect where the control section starts the normal heating control mode in a case where the temperature of refrigerant which is ascertained from the first sensor is higher than a return reference temperature. The return reference temperature is a temperature which is obtained by adding a return predetermined value to the outdoor air temperature which is ascertained from the second sensor. The return predetermined value is a value which is larger than the reference predetermined value.

In this air conditioner, it is possible to increase the efficiency of condensation in the indoor heat exchanger by restarting the normal heating control mode in a case where there are circumstances where the possibility of condensate formation being generated is low when the indoor expansion valve is fully open.

An air conditioner according to a tenth aspect is the air conditioner according to the seventh aspect where the control section fully opens the indoor expansion valve in a case where the temperature of refrigerant which is ascertained from the first sensor is lower than a stop reference temperature when performing the condensate formation suppressing control mode. The stop reference temperature is a temperature which is obtained by adding a reference predetermined value to the outdoor air temperature which is ascertained from the second sensor.

In this air conditioner, it is possible for it to be difficult for there to be condensate formation due to the indoor expansion valve being fully open by stopping subcooling control of the indoor expansion valve in a case where there are circumstances where generation of condensate formation is not sufficiently suppressed with only subcooling control of the indoor expansion valve in accordance with the condensate formation suppressing control mode.

An air conditioner according to an eleventh aspect is the air conditioner according to the tenth aspect where the control section starts the normal heating control mode in a case where the temperature of refrigerant which is ascertained from the first sensor is higher than a return reference temperature. The return reference temperature is a temperature which is obtained by adding a return predetermined value to the outdoor air temperature which is ascertained from the second sensor. The return predetermined value is a value which is larger than the reference predetermined value.

In this air conditioner, it is possible to increase the efficiency of condensation in the indoor heat exchanger by restarting the normal heating control mode in a case where there are circumstances where the possibility of condensate formation being generated is low when the indoor expansion valve is fully open.

An air conditioner according to a twelfth aspect is the air conditioner according to the second aspect where the control section controls the opening degree of the outdoor expansion valve in such a way that a degree of superheat of refrigerant which is suctioned into the compressor becomes a predetermined normal superheat target value while controlling the opening degree of the indoor expansion valve in such a way that a degree of subcooling of refrigerant at the outlet of the indoor heat exchanger becomes the predetermined normal subcooling target value in the normal heating control mode.

In this air conditioner, it is possible to obtain the effect of improving the condensation capabilities in the indoor heat exchanger and the effect of improving the evaporation capabilities in the outdoor heat exchanger at the same time by controlling the degree of subcooling in the indoor expansion valve and controlling the degree of superheat in the indoor expansion valve at the same time.

An air conditioner according to a thirteenth aspect is the air conditioner according to the third aspect where the control section controls the opening degree of the outdoor expansion valve in such a way that a degree of superheat of refrigerant which is suctioned into the compressor becomes a predetermined normal superheat target value while controlling the opening degree of the indoor expansion valve in such a way that a degree of subcooling of refrigerant at the outlet of the indoor heat exchanger becomes the predetermined normal subcooling target value in the normal heating control mode.

In this air conditioner, it is possible to obtain the effect of improving the condensation capabilities in the indoor heat exchanger and the effect of improving the evaporation capabilities in the outdoor heat exchanger at the same time by controlling the degree of subcooling in the indoor expansion valve and controlling the degree of superheat in the indoor expansion valve at the same time.

An air conditioner according to a fourteenth aspect is the air conditioner according to the twelfth aspect where the control section controls the opening degree of the indoor expansion valve in such a way that the degree of subcooling becomes a condensate formation suppressing subcooling target value when performing the condensate formation suppressing control mode. The condensate formation suppressing subcooling target value is a subcooling target value smaller than the normal subcooling target value in the normal heating control mode. The control section sets the condensate formation suppressing subcooling target value to be smaller as the temperature of refrigerant which is ascertained from the first sensor is lower.

In this air conditioner, subcooling control of the indoor expansion valve is continued by changing the target value to the condensate formation suppressing subcooling target value, which is a subcooling target value which is smaller than the normal subcooling target value in the normal heating control mode, when performing the condensate formation suppressing control mode. Due to this, it is possible to maintain the condensation capabilities of the indoor heat exchanger to a certain extent while suppressing generation of condensate formation. Moreover, since the condensate formation suppressing subcooling target value is set to be smaller as the temperature of refrigerant which is ascertained from the first sensor is lower, it is possible to maintain the condensation capabilities of the indoor heat exchanger to be as high as possible by keeping adjusting of the condensate formation suppressing subcooling target value, which is for suppressing condensate formation, to what is necessary according to the circumstances where it is likely that there will be condensate formation.

An air conditioner according to a fifteenth aspect is the air conditioner according to the thirteenth aspect where the control section controls the opening degree of the indoor expansion valve in such a way that the degree of subcooling becomes a condensate formation suppressing subcooling target value when performing the condensate formation suppressing control mode. The condensate formation suppressing subcooling target value is a subcooling target value smaller than the normal subcooling target value in the normal heating control mode. The control section sets the condensate formation suppressing subcooling target value to be smaller as the temperature of refrigerant which is ascertained from the first sensor is lower.

In this air conditioner, subcooling control of the indoor expansion valve is continued by changing the target value to the condensate formation suppressing subcooling target value, which is a subcooling target value which is smaller than the normal subcooling target value in the normal heating control mode, when performing the condensate formation suppressing control mode. Due to this, it is possible to maintain the condensation capabilities of the indoor heat exchanger to a certain extent while suppressing generation of condensate formation. Moreover, since the condensate formation suppressing subcooling target value is set to be smaller as the temperature of refrigerant which is ascertained from the first sensor is lower, it is possible to maintain the condensation capabilities of the indoor heat exchanger to be as high as possible by keeping adjusting of the condensate formation suppressing subcooling target value, which is for suppressing condensate formation, to what is necessary according to the circumstances where it is likely that there will be condensate formation. Moreover, it is possible to maintain a state where the normal heating control mode is performed and the efficiency of condensation in the indoor heat exchange is high until there is a state where the predetermined condensate formation condition, which is determined by factoring in the possibility that condensate formation is generated due to changes in outdoor air temperature, is satisfied.

An air conditioner according to a sixteenth aspect is the air conditioner according to the fifteenth aspect where the control section fully opens the indoor expansion valve in a case where the temperature of refrigerant which is ascertained from the first sensor is lower than a stop reference temperature when performing the condensate formation suppressing control mode. The stop reference temperature is a temperature which is obtained by adding a reference predetermined value to the outdoor air temperature which is ascertained from the second sensor.

In this air conditioner, it is possible for it to be difficult for there to be condensate formation due to the indoor expansion valve being fully open by stopping subcooling control of the indoor expansion valve in a case where there are circumstances where generation of condensate formation is not sufficiently suppressed with only subcooling control of the indoor expansion valve in accordance with the condensate formation suppressing control mode.

An air conditioner according to a seventeenth aspect is the air conditioner according to the sixteenth aspect where the control section starts the normal heating control mode in a case where the temperature of refrigerant which is ascertained from the first sensor is higher than a return reference temperature. The return reference temperature is a temperature which is obtained by adding a return predetermined value to the outdoor air temperature which is ascertained from the second sensor. The return predetermined value is a value which is larger than the reference predetermined value.

In this air conditioner, it is possible to increase the efficiency of condensation in the indoor heat exchanger by restarting the normal heating control mode in a case where there are circumstances where the possibility of condensate formation being generated is low when the indoor expansion valve is fully open.

An air conditioner according to an eighteenth aspect is the air conditioner according to the second aspect where a third sensor is further provided. The third sensor is arranged and configured to ascertain temperature of refrigerant flowing between the indoor heat exchanger and the indoor expansion valve. The control section forcibly stops the compressor in a case when a predetermined stopping condition is satisfied. The predetermined stopping condition includes a condition that a predicted temperature passing through the connecting section is lower than the temperature ascertained from the second sensor. The predicted temperature passing through the connecting section is obtained by subtracting a losing temperature from the temperature ascertained from the third sensor. The losing temperature is a temperature predetermined as a temperature that refrigerant supposedly loses during flowing from a position where the third sensor is arranged between the indoor heat exchanger and the indoor expansion valve to a position of the connecting section.

In view of an individual difference occurred at the time of manufacture of a product of the second sensor or the third sensor and an accidental error of temperature sensing, the predetermined stopping condition may include a condition that the predicted temperature of refrigerant passing through the connecting section is lower than a temperature obtained by adding a predetermined value to the temperature ascertained from the second sensor. In this case, even though the sensors have the individual difference, it is possible to suppress generation of condensate formation on the connecting section with more certainty. The predetermined value may be 1.5.

In this air conditioner, the first sensor is provided for ascertaining the temperature or pressure of refrigerant flowing between the indoor expansion valve and the outdoor expansion valve. However, in case that the refrigerant pipe between the indoor expansion valve and the outdoor expansion valve gets wet by rain, it becomes difficult for the first sensor to sense temperature which is not affected by rain, because the ascertained value by the first sensor is decreased by rain (the temperature of refrigerant is not correctly ascertained.). In this case, it is difficult to judge a condensate situation at the connecting section by using only the ascertained value by the first sensor In contrast to this, in this air conditioner, the condition for the forcible stop of the compressor includes the condition that the predicted temperature passing through the connecting section is lower than the temperature ascertained from the second sensor. And the predicted temperature passing through the connecting section is obtained by subtracting the losing temperature from the temperature ascertained from the third sensor. Thus, even though the ascertained value by the first sensor is decreasing by rain, it is possible to suppress making a judgement error of the condensate situation at the connecting section by rain by judging the predetermined stopping condition by using the predicted temperature predicted though refrigerant flowing between the indoor expansion valve and the outdoor expansion valve obtained from the temperature ascertained from the third sensor. Therefore, it is possible for the compressor to drive continuously while avoiding the forcible stop of the compressor which is caused by the wetting of the connecting section by rain.

An air conditioner according to a nineteenth aspect is the air conditioner according to the eighth aspect where a third sensor is further provided. The third sensor is arranged and configured to ascertain temperature of refrigerant flowing between the indoor heat exchanger and the indoor expansion valve. The control section forcibly stops the compressor in a case when a predetermined stopping condition is satisfied. The predetermined stopping condition includes a condition that a predicted temperature passing through the connecting section is lower than the temperature ascertained from the second sensor. The predicted temperature passing through the connecting section is obtained by subtracting a losing temperature from the temperature ascertained from the third sensor. The losing temperature is a temperature predetermined as a temperature that refrigerant supposedly loses during flowing from a position where the third sensor is arranged between the indoor heat exchanger and the indoor expansion valve to a position of the connecting section.

In view of an individual difference occurred at the time of manufacture of a product of the second sensor or the third sensor and an accidental error of temperature sensing, the predetermined stopping condition may include a condition that the predicted temperature of refrigerant passing through the connecting section is lower than a temperature obtained by adding a predetermined value to the temperature ascertained from the second sensor. In this case, even though the sensors have the individual difference, it is possible to suppress generation of condensate formation on the connecting section with more certainty. The predetermined value may be 1.5.

In this air conditioner, the first sensor is provided for ascertaining the temperature or pressure of refrigerant flowing between the indoor expansion valve and the outdoor expansion valve. However, in case that the refrigerant pipe between the indoor expansion valve and the outdoor expansion valve gets wet by rain, it becomes difficult for the first sensor to sense temperature which is not affected by rain, because the ascertained value by the first sensor is decreased by rain (the temperature of refrigerant is not correctly ascertained.). In this case, it is difficult to judge a condensate situation at the connecting section by using only the ascertained value by the first sensor In contrast to this, in this air conditioner, the condition for the forcible stop of the compressor includes the condition that the predicted temperature passing through the connecting section is lower than the temperature ascertained from the second sensor. And the predicted temperature passing through the connecting section is obtained by subtracting the losing temperature from the temperature ascertained from the third sensor. Thus, even though the ascertained value by the first sensor is decreasing by rain, it is possible to suppress making a judgement error of the condensate situation at the connecting section by rain by judging the predetermined stopping condition by using the predicted temperature predicted though refrigerant flowing between the indoor expansion valve and the outdoor expansion valve obtained from the temperature ascertained from the third sensor. Therefore, it is possible for the compressor to drive continuously while avoiding the forcible stop of the compressor which is caused by the wetting of the connecting section by rain. Especially, in view of the control of the air conditioner according to the eighth aspect, this air conditioner achieves both effects including an increasing of driving continuity of the compressor by changing from the condensate formation suppressing control mode to the control that the indoor expansion valve is fully opened, and an increasing of driving continuity of the compressor while avoiding the forcible stop of the compressor which is caused by the wetting of the connecting section by rain.

An air conditioner according to a twentieth aspect is the air conditioner according to the eighteenth aspect where a memory is further provided. The memory is arranged and configured to store the losing temperatures depending on the speed of rotations of the compressor. The control section determines whether the predetermined stopping condition is satisfied by using the losing temperature depending on the speed of rotations of the compressor at a moment of the judging.

In this air conditioner, in the judgement of the predetermined stopping condition, it is possible to use more accurate value based on the driving situation by using the losing temperature of refrigerant which the refrigerant supposedly losses based on the driving situation during the flowing from the position which the third sensor is arranged between the indoor heat exchanger and the indoor expansion valve to the position which the connecting section is arranged.

An air conditioner according to a twenty-first aspect is the air conditioner according to the eighteenth aspect where the predetermined stopping condition includes a condition that the temperature of refrigerant ascertained from the first sensor is lower than a temperature obtained by adding a revising value to the temperature ascertained from the second sensor.

In this air conditioner, the predetermined stopping condition includes both conditions including the condition that the predicted temperature of refrigerant passing through the connecting section is lower than a temperature ascertained from the second sensor, and the condition that the temperature of refrigerant ascertained from the first sensor is lower than the temperature obtained by adding the revising value to the temperature ascertained from the second sensor. Therefore, it is possible to suppress generation of condensate formation on the connecting section, and it is possible for the compressor to drive continuously by avoiding the forcible stop of the compressor as much as possible.

An air conditioner according to a twenty-second aspect is the air conditioner according to the eighteenth aspect where the predetermined stopping condition further includes a condition that a state continues during a predetermined judging time. The state is that the predicted temperature is lower than the temperature ascertained from the second sensor.

In this air conditioner, the condition of the predetermined judging time is included in the predetermined stopping condition. Therefore, it is possible to avoid frequent forcible stop of the compressor and to stabilize the control.

An air conditioner according to a twenty-third aspect is the air conditioner according to the twenty-first aspect where the predetermined stopping condition further includes a condition that a state continues during a predetermined judging time. The state is that the predicted temperature is lower than the temperature ascertained from the second sensor and the temperature of refrigerant ascertained from the first sensor is lower than a temperature obtained by adding the revising value to the temperature ascertained from the second sensor.

In this air conditioner, two temperature conditions and the time condition of the predetermined judging time are included in the predetermined stopping condition. Therefore, it is possible to avoid unnecessary or frequent forcible stop of the compressor and to stabilize the control.

Advantageous Effects of the Invention

In the air conditioner according to the invention of the present application, it is possible to suppress generation of condensate formation on a connecting section since the extent of the reducing of pressure of refrigerant in an indoor expansion valve is suppressed to be small even in circumstances where a predetermined condensate formation condition is satisfied.

DESCRIPTION OF EMBODIMENTS

An embodiment of an air conditioner according to the present invention will be described below based on the diagrams.

Here, the air conditioner according to the present invention is not limited to the embodiment and modified examples described below and modifications are possible over a range which does not depart from the gist of the invention.

(1) First Embodiment (1-1) Configuration of Air Conditioner

Figure 1:
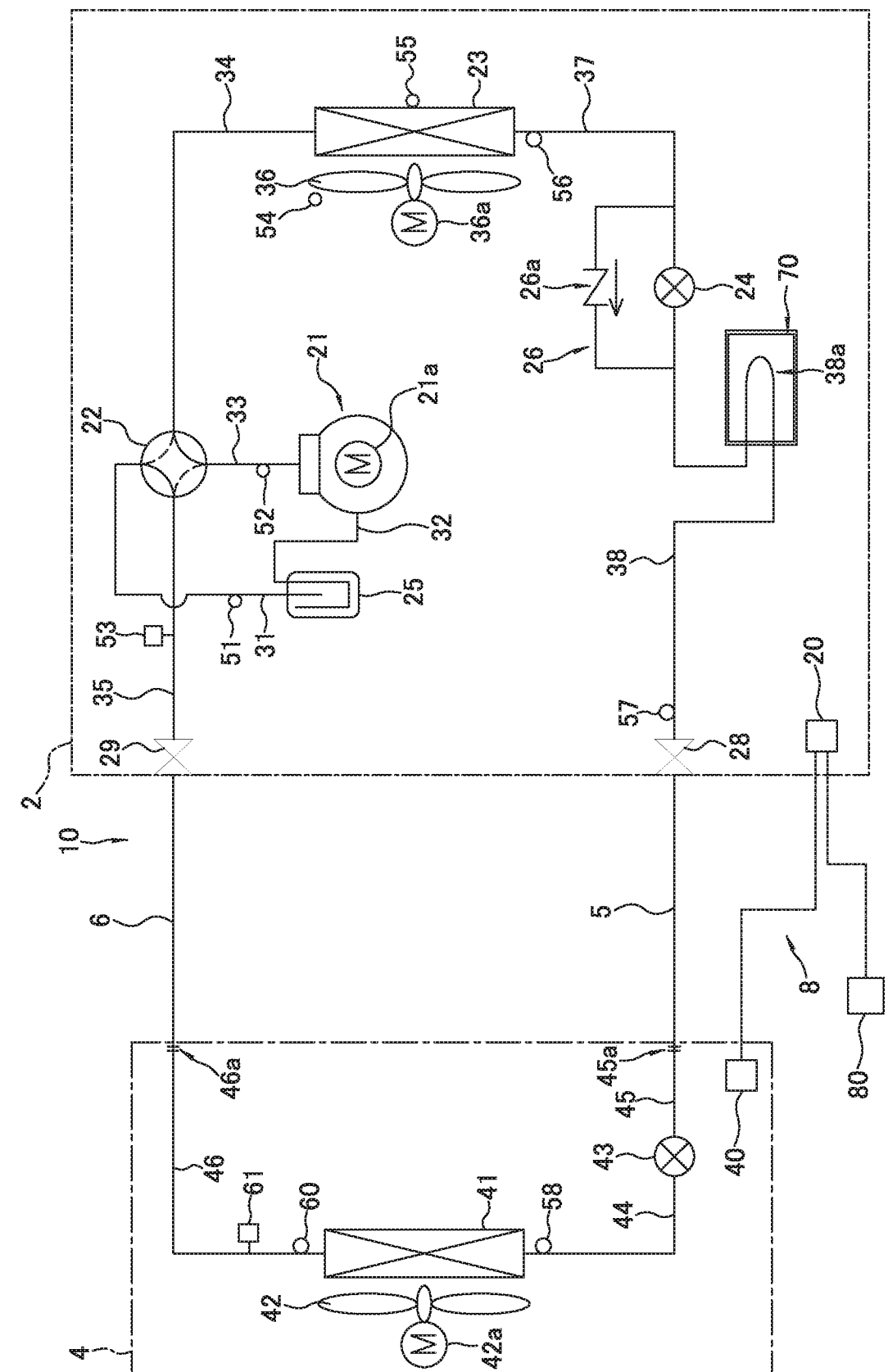
FIG. 1 is outline configuration diagram of an air conditioner according to an embodiment of the present invention.
Figure 2:
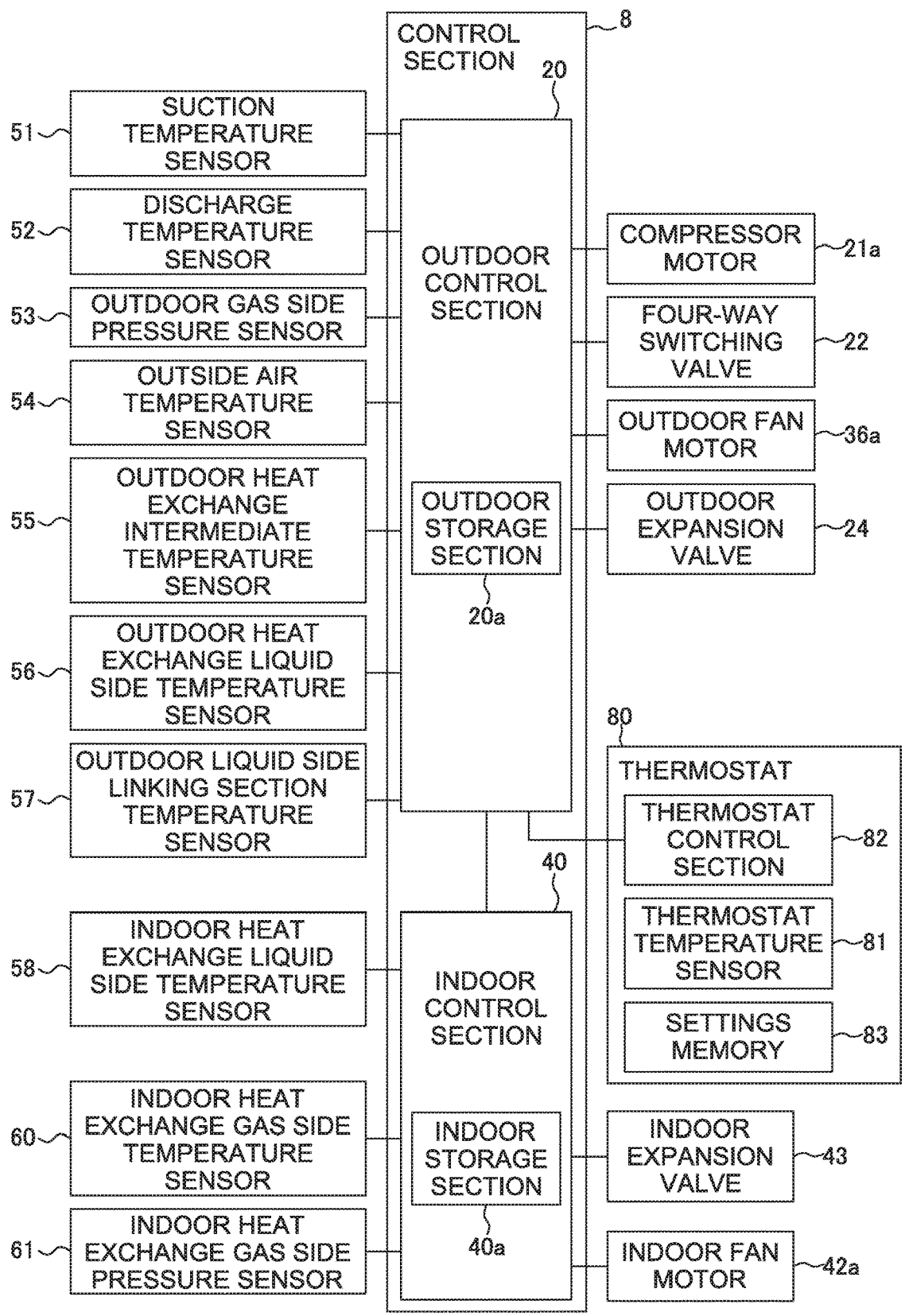
FIG. 2 is a control block diagram for the air conditioner.

FIG. 1 is an outline configuration diagram of an air conditioner 1 according to the present invention. FIG. 2 is a control block diagram for the air conditioner 1.

The air conditioner 1 is an apparatus where it is possible to perform cooling and heating indoors such as in a building by performing a vapor compression type of refrigerant cycle.

The air conditioner 1 is configured to mainly have a thermostat 80, an outdoor unit 2, and an indoor unit 4.

Here, the outdoor unit 2 and the indoor unit 4 are connected via a liquid refrigerant communication pipe 5 and a gas refrigerant communication pipe 6. That is a vapor compression type of refrigerant circuit 10 in the air conditioner 1 is configured by connecting the outdoor unit 2 and the indoor unit 4 via the liquid refrigerant communication pipe 5 and the gas refrigerant communication pipe 6.

(1-2) Thermostat 80 The thermostat 80 is a controller for performing commands for control of operation of the air conditioner 1 based on the temperature at a predetermined location inside a building and has a thermostat temperature sensor 81, a thermostat control section 82, a settings memory 83, and the like.

The thermostat temperature sensor 81 detects the temperature of the surroundings at a location where the thermostat 80 is installed.

Various types of settings data which relate to various types of operation conditions such as a cooling operation condition and a heating operation condition are stored in advance in the settings memory 83. The cooling operation condition is not particularly limited and it is possible for, for example, the range of temperatures over which cooling operation is performed in the air conditioner 1 to be the cooling operation condition. In detail, the cooling operation condition may be set in advance to be satisfied as, for example, temperatures which are equal to or lower than a predetermined cooling operation start temperature and temperatures which are equal to or higher than a predetermined cooling operation stop temperature. The same applies to the heating operation condition.

The thermostat control section 82 sends commands for executing operation of the air conditioner 1 in a case where it is determined that the temperature detected by the thermostat temperature sensor 81 matches with the various types of operation conditions which are stored in the settings memory 83. In detail, the thermostat control section 82 sends control commands to an outdoor control section 20 of the outdoor unit 2 which will be described later. That is, the thermostat control section 82 sends control command which start cooling operation to the outdoor control section 20 in a case where the temperature detected by the thermostat temperature sensor 81 satisfies the cooling operation condition and sends control command which stop cooling operation to the outdoor control section 20 in a case where the temperature detected by the thermostat temperature sensor 81 does not satisfy the cooling operation condition. In the same manner, the thermostat control section 82 sends control command which start heating operation to the outdoor control section 20 in a case where the temperature detected by the thermostat temperature sensor 81 satisfies the heating operation condition and sends control command which stop heating operation to the outdoor control section 20 in a case where the temperature detected by the thermostat temperature sensor 81 does not satisfy the heating operation condition.

(1-3) Indoor Unit 4

The indoor unit 4 configures a portion of the refrigerant circuit 10 and is installed in, for example, the basement of a building. Air where air conditioning is carried out by the indoor unit 4 is supplied to one or a plurality of air conditioning target spaces via a duct or the like which is not shown in the diagrams and air conditioning is carried out in the air conditioning target spaces.

The indoor unit 4 has an indoor heat exchanger 41, an indoor fan 42, an indoor fan motor 42a, an indoor expansion valve 43, an indoor heat exchange liquid side temperature sensor 58, an indoor heat exchange gas side temperature sensor 60, an indoor heat exchange gas side pressure sensor 61, an indoor control section 40, and the like.

The indoor heat exchanger 41 is a heat exchanger which cools indoor air by functioning as an evaporator for refrigerant during cooling operation and heats indoor air by functioning as a radiator for refrigerant during heating operation.

An indoor gas side refrigerant pipe 46 extends out from the gas side of the indoor heat exchanger 41. An indoor gas side port 46a is provided at an edge section, which is on the opposite side to the indoor heat exchanger 41 side, in the indoor gas side refrigerant pipe 46. The gas refrigerant communication pipe 6 is connected with the indoor gas side port 46a.

A first indoor liquid side refrigerant pipe 44 extends out from the liquid side of the indoor heat exchanger 41. The indoor expansion valve 43 is provided in the first indoor liquid side refrigerant pipe 44 on the opposite side to the indoor heat exchanger 41 side. The indoor expansion valve 43 is an electric expansion valve which is able to be controlled to be opened and closed and adjusts the extent of the reducing of pressure of refrigerant which passes through the indoor expansion valve 43 according to the opening degree.

A second indoor liquid side refrigerant pipe 45 extends out from the indoor expansion valve 43. An indoor liquid side port 45a is provided at an edge section, which is on the opposite side to the indoor expansion valve 43 side, in the second indoor liquid side refrigerant pipe 45. The liquid refrigerant communication pipe 5 is connected with the indoor liquid side port 45a.

The indoor fan 42 is provided so as to face the indoor heat exchanger 41 and generates an air flow in the outdoor unit 4 in order for air in the surroundings to pass by the indoor heat exchanger 41. Then, the indoor fan 42 supplies air, where air conditioning is carried out after heat exchange with refrigerant in the indoor heat exchanger 41, to the air conditioning target spaces via a duct or the like which is not shown in the diagrams. In the present embodiment, a centrifugal fan, a multi-blade fan, or the like which is driven using the indoor fan motor 42a is used as the indoor fan 42.

The indoor heat exchange liquid side temperature sensor 58 detects the temperature of refrigerant at the liquid side of the indoor heat exchanger 41. The indoor heat exchange gas side temperature sensor 60 detects the temperature of refrigerant at the gas side of the indoor heat exchanger 41. The indoor heat exchange gas side pressure sensor 61 detects the pressure of refrigerant at the gas side of the indoor heat exchanger 41. These sensors are all connected with the indoor control section 40 and it is possible for the indoor control section 40 to ascertain data detected by each of the sensors.

The indoor control section 40 controls the actions of each section which configures the indoor unit 4. In detail, the indoor control section 40 controls the amount of refrigerant which passes through the indoor expansion valve 43 by controlling the opening degree of the indoor expansion valve 43 and controls the air volume of the indoor fan 42 by controlling the indoor fan motor 42a. The indoor control section 40 has a microcomputer which is provided in order to perform control of the indoor unit 4, memory such as an indoor storage section 40a, and the like. The indoor control section 40 is connected to be able to communicate with the outdoor control section 20 and is able to perform transferring of various types of control signals and the like.

Here, in the present embodiment, the indoor unit 4 itself does not have a sensor which detects the air temperature in the air conditioning target spaces.

(1-4) Outdoor Unit 2

The outdoor unit 2 is installed outdoors and configures a portion of the refrigerant circuit 10.

The outdoor unit 2 mainly has a compressor 21, a four way switching valve 22, an outdoor heat exchanger 23, an outdoor fan 36, an outdoor expansion valve 24, a bypass circuit 26, an electrical component cooling section 38a, a gas and liquid separator 25, a liquid side shut-off valve 28, a gas side shut-off valve 29, a suction temperature sensor 51, a discharge temperature sensor 52, an outdoor gas side pressure sensor 53, an outdoor air temperature sensor 54, an outdoor heat exchange intermediate temperature sensor 55, an outdoor heat exchange liquid side temperature sensor 56, an outdoor liquid side linking section temperature sensor 57, the outdoor control section 20, and the like.

The compressor 21 is a device which compresses low-pressure refrigerant so as to become high-pressure refrigerant in the refrigerant cycle. The compressor 21 has a tightly sealed configuration where a positive displacement compression element (which is not shown in the diagrams) such as a rotary type or a scrolling type is rotationally driven using a compressor motor 21a where it is possible for the frequency (the speed of rotations) to be controlled using an inverter. That is, the compressor 21 is configured so that it is possible to control the driving capacity by changing the frequency (the speed of rotations). The discharge side of the compressor 21 is connected to a discharge pipe 33. The discharge pipe 33 is a refrigerant pipe which connects the discharge side of the compressor 21 and the four way switching valve 22. The suction side of the compressor 21 is connected to a suction pipe 32.

The gas and liquid separator 25 is provided between the suction side of the compressor 21 and the four way switching valve 22. In detail, the gas and liquid separator 25 is connected to the suction pipe 32 on the opposite side to the compressor 21 side. In addition, the gas and liquid separator 25 is also connected with the four way switching valve 22 via a gas and liquid separator introduction pipe 31. Using the gas and liquid separator 25, it is possible for mainly only gas refrigerant, out of refrigerant flowing in from the four way switching valve 22 via the gas and liquid separator introduction pipe 31, to be suctioned into the compressor 21 via the suction pipe 32.

The four way switching valve 22 is a switching valve for switching the direction of the flow of refrigerant in the refrigerant circuit 10. During cooling operation, the four way switching valve 22 performs switching to a cooling cycle state where the outdoor heat exchanger 23 functions as a radiator for refrigerant which is compressed in the compressor 21 and the indoor heat exchanger 41 functions as an evaporator for refrigerant where heat is released in the outdoor heat exchanger 23.

That is, the four way switching valve 22 connects the discharge side of the compressor 21 (here, the discharge pipe 33) and the gas side of the outdoor heat exchanger 23 (here, a first gas refrigerant pipe 34) during cooling operation (refer to the solid line in the four way switching valve 22 in FIG. 1). Moreover, the suction side of the compressor 21 (here, the suction pipe 32, the gas and liquid separator 25, and the gas and liquid separator introduction pipe 31) and the gas refrigerant communication pipe 6 side (here, a second gas refrigerant pipe 35) are connected (refer to the solid line in the four way switching valve 22 in FIG. 1).

In addition, during heating operation, the four way switching valve 22 performs switching to a heating cycle state where the outdoor heat exchanger 23 functions as an evaporator for refrigerant where heat is released in the indoor heat exchanger 41 and the indoor heat exchanger 41 functions as a radiator for refrigerant which is compressed in the compressor 21. That is, the four way switching valve 22 connects the discharge side of the compressor 21 (here, the discharge pipe 33) and the gas refrigerant communication pipe 6 side (here, the second gas refrigerant pipe 35) during heating operation (refer to the dashed line in the four way switching valve 22 in FIG. 1). Moreover, the suction side of the compressor 21 (here, the suction pipe 32, the gas and liquid separator 25, and the gas and liquid separator introduction pipe 31) and the gas side of the outdoor heat exchanger 23 (here, the first gas refrigerant pipe 34) are connected (refer to the dashed line in the four way switching valve 22 in FIG. 1). Here, the first gas refrigerant pipe 34 is a refrigerant pipe which connects the four way switching valve 22 and the gas side of the outdoor heat exchanger 23. The second gas refrigerant pipe 35 is a refrigerant pipe which connects the four way switching valve 22 and the gas side shut-off valve 29.

The outdoor heat exchanger 23 is a heat exchanger which functions as a radiator for refrigerant where outdoor air is a source for cooling during cooling operation and which functions as an evaporator for refrigerant where outdoor air is a source for heating during heating operation. The liquid side of the outdoor heat exchanger 23 is connected to a first liquid refrigerant pipe 37 and the gas side of the outdoor heat exchanger 23 is connected to the first gas refrigerant pipe 34. The first liquid refrigerant pipe 37 is a refrigerant pipe which connects the liquid side of the outdoor heat exchange 23 and the outdoor expansion valve 24. Here, a second liquid refrigerant pipe 38 is connected to the outdoor expansion valve 24 at the opposite side to the side where the first liquid refrigerant pipe 37 is connected. The second liquid refrigerant pipe 38 extends to the liquid side shut-off valve 28. Here, the liquid refrigerant communication pipe 5 is connected with the liquid side shut-off valve 28.

The bypass circuit 26 is a bypass circuit which connects one side of the outdoor expansion valve 24 to the other side of the outdoor expansion valve 24 in the refrigerant circuit 10. In detail, the bypass circuit 26 connects a portion of the first liquid refrigerant pipe 37 and a portion of the second liquid refrigerant pipe 38. A check valve 26a is provided midway along the bypass circuit 26. The check valve 26a is configured so as to only permit a flow of refrigerant when refrigerant flowing in the first liquid refrigerant pipe 37 is sent toward the second liquid refrigerant pipe 38 and so as not to permit a flow of refrigerant from the second liquid refrigerant pipe 38 side toward the first liquid refrigerant pipe 37 side.

The outdoor expansion valve 24 is a valve which, during heating operation, reduces the pressure of refrigerant whose pressure has been reduced to an intermediate pressure in the refrigerant cycle in the indoor expansion valve 43, or reduces the pressure of high-pressure refrigerant in the refrigerant cycle when the indoor expansion valve 43 is in a state of being fully open, to a low pressure in the refrigerant cycle. In the present embodiment, the outdoor expansion valve 24 is configured by an electric expansion valve where it is possible to adjust the opening degree to a plurality of levels. Here, reducing of pressure of refrigerant using the outdoor expansion valve 24 is not performed during cooling operation since refrigerant flows through the bypass circuit 26 described above.

The electrical component cooling section 38a, which cools an electrical component 70, is provided midway along the second liquid refrigerant pipe 38. In detail, the electrical component cooling section 38a is configured by adjusting the position through which the second liquid refrigerant pipe 38 passes so that it is possible for a portion of the second liquid refrigerant pipe 38 to pass through with thermal contact to the installation position of the electrical component 70. Here, the electrical component 70 is not particularly limited, but, for example, a substrate or the like where a power element or the like, which is included in a component which configures an inverter circuit such as the compressor motor 21a, is mounted. The electric component cooling section 38a may be configured to be provided with a refrigerant jacket which is not shown in the diagrams between the outer surface of the piping and the electrical component 70 and to be able to cool the electrical component 70 via the refrigerant jacket.

The outdoor fan 36 generates an air flow using outdoor air for exhausting to the outside after heat exchange with refrigerant in the outdoor heat exchanger 23 by outdoor air being suctioned into the outdoor unit 2. Here, a propeller fan or the like which is driven using an outdoor fan motor 36a is used as the outdoor fan 36.

The suction temperature sensor 51 is provided in the gas and liquid separator introduction pipe 31 and detects the temperature of refrigerant which is suctioned from the four way switching valve 22 into the compressor 21 via the gas and liquid separator 25 (temperature of low-pressure refrigerant in the refrigerant cycle). The discharge temperature sensor 52 is provided in the discharge pipe 33 and detects the temperature of high-pressure refrigerant in the refrigerant cycle which is discharged from the compressor 21. The outdoor gas side pressure sensor 53 is provided in the second gas refrigerant pipe 35 and detects the pressure of refrigerant flowing between the four way switching valve 22 and the gas side shut-off valve 29. The outdoor air temperature sensor 54 detects the temperature of outdoor air which is suctioned into the outdoor unit 2 (the temperature of air before the air is passed through the outdoor heat exchanger 23 and is also referred to as the outdoor air temperature). The outdoor heat exchange intermediate temperature sensor 55 detects the temperature of refrigerant at an intermediate portion of the outdoor heat exchanger 23. The outdoor heat exchange liquid side temperature sensor 56 detects the temperature of refrigerant at the liquid side of the outdoor heat exchanger 23. The outdoor liquid side linking section temperature sensor 57 is provided in the second liquid refrigerant pipe 38 between the electrical component cooling section 38a and the liquid side shut-off valve 28 and detects the temperature of refrigerant flowing through this portion. These sensors are all connected with the outdoor control section 20 and it is possible for the outdoor control section 20 to ascertain the data detected by each of the sensors.

The outdoor control section 20 controls the actions of each section which configures the outdoor unit 2. In detail, the outdoor control section 20 controls the pressure and amount of circulation of refrigerant in the refrigerant circuit 10 by controlling the driving frequency of the compressor motor 21a, performs control of switching of the connection states of the four way switching valve 22, controls the amount of refrigerant which passes through the outdoor expansion valve 24 by controlling the opening degree of the outdoor expansion valve 24, and controls the air volume of the outdoor fan 36 by controlling the outdoor fan motor 36a. The outdoor control section 20 has a microcomputer which is provided in order to perform control of the outdoor unit 2, memory such as an outdoor storage section 20a, the electrical component 70, and the like. The outdoor control section 20 is connected to be able to communicate with the indoor control section 40 and is able to perform transferring of various types of control signals and the like. In addition, the outdoor control section 20 is connected to be able to communicate with the thermostat control section 82 of the thermostat 80 and it is possible to receive various types of control commands from the thermostat control section 82.

Here, an amount of refrigerant, where the coefficient of performance during cooling operation is optimal in a case where operation is performed under conditions where the cooling load during cooling operation and the heating load during heating operation are substantially the same, is filled into the refrigerant circuit 10.

(1-5) Liquid Refrigerant Communication Pipe 5 and Gas Refrigerant Communication Pipe 6

The liquid refrigerant communication pipe 5 and the gas refrigerant communication pipe 6 are refrigerant pipes which are built on location when the air conditioner 1 is installed, and pipes which have various lengths and pipe diameters are used according to the instillation conditions of the outdoor unit 2 and the indoor unit 4.

Here, the liquid refrigerant communication pipe 5 has a portion which is not covered using an insulation material or the like and is exposed to outdoor air in the present embodiment.

(1-6) Control Section 8

It is possible for the air conditioner 1 to perform operation control of each of the devices of the outdoor unit 2 and the indoor unit 4 using a control section 8 which is configured from the indoor control section 40 and the outdoor control section 20. That is, the control section 8 is configured to perform operation control of the entirety of the air conditioner 1 which includes refrigerant cycle operation such as cooling operation and heating operation using the indoor control section 40 and the outdoor control section 20. The control section 8 is connected as shown in FIG. 2 so that it is possible to receive control commands from the thermostat 80 and signals which are detected using each type of the sensors 51 to 58, 60, and 61 and the like and is connected so that it is possible to control each type of device, the valves 21a, 22, 24, 36a, 42a, and 43, and the like based on these control commands and signals.

As above, the air conditioner 1 includes the refrigerant circuit 10 which is configured by connecting the compressor 21, the radiator, the expansion valve (here, the indoor expansion valve 43 and/or the outdoor expansion valve 24), and the evaporator, and the control section 8. Then, refrigerant cycle operation and control are performed in the air conditioner 1 as follows using the control section 8.

(2) Basic Operations of Air Conditioner

Next, the basic operations of the air conditioner 1 will be described.

It is possible for the air conditioner 1 to perform cooling operation, which is refrigerant cycle operation where indoor cooling is performed by causing the indoor heat exchanger 41 to function as an evaporator for refrigerant, and heating operation, which is refrigerant cycle operation where indoor heating is performed by causing the indoor heat exchanger 41 to function as a radiator for refrigerant, as basic actions. In addition, the air conditioner 1 can temporarily perform defrosting operation for melting frost which is attached to the outdoor heat exchanger 23 in a case where frost formation is generated on the outdoor heat exchanger 23 during heating operation. Furthermore, condensate suppressing control is performed so that generation of condensate formation is suppressed in a case where there are circumstances where it is likely that there will be condensate formation on the outer surface of the liquid refrigerant communication pipe 5 during heating operation. Here, these basic actions are performed using the control section 8.

(2-1) Cooling Operation

Cooling operation in the air conditioner 1 is performed by the outdoor control section 20 receiving a command to start cooling operation which is sent from the thermostat control section 82 in a case where the thermostat control section 82 of the thermostat 80 determines that a cooling operation condition is satisfied based on the temperature detected by the thermostat temperature sensor 81.

The four way switching valve 22 is switched to the cooling cycle state (the state which is indicated by the solid line in FIG. 1) during cooling operation.

Low-pressure gas refrigerant in the refrigerant cycle in the refrigerant circuit 10 is suctioned into the compressor 21 and is discharged after being compressed to a high pressure in the refrigerant cycle.

The high-pressure gas refrigerant which is discharged from the compressor 21 is sent to the outdoor heat exchanger 23 via the four way switching valve 22.

The high-pressure gas refrigerant which is sent to the outdoor heat exchanger 23 becomes high-pressure liquid refrigerant in the outdoor heat exchanger 23 due to heat being released by performing heat exchange with outdoor air which is supplied as a source for cooling using the outdoor fan 36.

The high-pressure liquid refrigerant where heat is released in the outdoor heat exchanger 23 passes through the bypass circuit 26 without passing through the outdoor expansion valve 24 and cools the electrical component 70 by flowing through the electrical component cooling section 38a.

The refrigerant which passes through the electrical component cooling section 38a passes through the liquid side shut-off valve 28 and the liquid refrigerant communication pipe 5. Then, the pressure of the refrigerant is reduced to a low pressure in the refrigerant cycle in the indoor expansion valve 43. The refrigerant is in a state of two phases of gas and liquid and is sent to the indoor heat exchanger 41.

Here, the indoor control section 40 controls the opening degree of the indoor expansion valve 43 in such a way that a degree of superheat of refrigerant flowing through the outlet of the indoor heat exchanger 41 (the gas side of the indoor heat exchanger 41 in cooling operation) is maintained at target superheat. The target superheat is stored in advance in the indoor storage section 40*a* which is held in the indoor control section 40. In the present embodiment, the indoor control section 40 controls the opening degree of the indoor expansion valve 43 in such a way that the degree of superheat at the outlet of the indoor heat exchanger 41 is maintained at target superheat using the temperature detected by the indoor heat exchange gas side temperature sensor 60 and the pressure detected by the indoor heat exchange gas side pressure sensor 61. Although not particularly limited, the indoor control section 40 controls the opening degree of the indoor expansion valve 43 in such a way that, in detail, superheat, which is obtained by subtracting a refrigerant saturation temperature corresponding to the pressure detected by the indoor heat exchange gas side pressure sensor 61 from the temperature detected by the indoor heat exchange gas side temperature sensor 60, is maintained at the target superheat.

The low-pressure refrigerant in a state of two phases of gas and liquid which is sent to the indoor heat exchanger 41 evaporates in the indoor heat exchanger 41 by performing heat exchange with indoor air which is supplied as a source for heating using the indoor fan 42. Due to this, air where air conditioning for cooling is carried out is obtained and supplied to the air conditioning target spaces via a duct or the like which is not shown in the diagrams.

The low-pressure gas refrigerant which evaporates in the indoor heat exchanger 41 is suctioned again into the compressor 21 via the gas refrigerant communication pipe 6, the gas side shut-off valve 29, the four way switching valve 22, and the gas and liquid separator 25.

(2-2) Heating Operation

Heating operation (normal heating control mode) in the air conditioner 1 is performed by the outdoor control section 20 receiving a command to start heating operation which is sent from the thermostat control section 82 in a case where the thermostat control section 82 of the thermostat 80 determines that a heating operation condition is satisfied based on the temperature detected by the thermostat temperature sensor 81. Here, normal heating operation (normal heating control) will be mainly described here.

The four way switching valve 22 is switched to the heating cycle state (the state which is indicated by the dashed line in FIG. 1) during heating operation.

Low-pressure gas refrigerant in the refrigerant cycle in the refrigerant circuit 10 is suctioned into the compressor 21 and is discharged after being compressed to a high pressure in the refrigerant cycle.

The high-pressure gas refrigerant which is discharged from the compressor 21 is sent to the indoor heat exchanger 41 via the four way switching valve 22, the gas side shut-off valve 29, and the gas refrigerant communication pipe 6.

The high-pressure gas refrigerant which is sent to the indoor heat exchanger 41 becomes high-pressure liquid refrigerant in the indoor heat exchanger 41 due to heat being released by performing heat exchange with indoor air which is supplied as a source for cooling using the indoor fan 42. Due to this, air where air conditioning for heating is carried out is obtained and supplied to the air conditioning target spaces via a duct or the like which is not shown in the diagrams.

The pressure of the high-pressure liquid refrigerant where heat is released in the indoor heat exchanger 41 is reduced to an intermediate pressure in the refrigerant cycle in a case where subcooling control of the indoor expansion valve 43 is carried out (in a case where the opening degree is not fully open) and the high-pressure liquid refrigerant passes through the indoor expansion valve 43 without the pressure being particularly reduced in a case where subcooling control of the indoor expansion valve 43 is not carried out (in a case where the opening degree is fully open).

Here, the case where subcooling control of the indoor expansion valve 43 is carried out is not particularly limited, but there is the case in the present embodiment where a subcooling control start condition, which is based on the outdoor air temperature and the temperature of refrigerant flowing through the portion of the refrigerant circuit 10 from the indoor expansion valve 43 to the outdoor expansion valve 24, is satisfied. In detail, subcooling control in the indoor expansion valve 43 is started by the indoor control section 40 determining that the subcooling control start condition is satisfied in a case where the temperature detected by the outdoor liquid side linking section temperature sensor 57, which detects the temperature of refrigerant flowing through a portion, which is close to the liquid side shut-off valve 28, in the second liquid refrigerant pipe 38 which is the temperature of refrigerant which is substantially equal to the temperature of refrigerant flowing through the liquid refrigerant communication pipe 5, is higher than the temperature which is obtained by adding a start predetermined value (5 degrees C. in the present embodiment) to the temperature detected by the outdoor air temperature sensor 54 and the temperature detected by the outdoor liquid side linking section temperature sensor 57 exceeds a start predetermined temperature (27 degrees C. in the present embodiment).

Here, the case where subcooling control of the indoor expansion valve 43 is stopped is not particularly limited, but subcooling control of the indoor expansion valve 43 is stopped and the indoor expansion valve 43 is set to a state of being fully open in the present embodiment by the indoor control section 40 determining that a subcooling control stop condition is satisfied in a case where the temperature detected by the outdoor liquid side linking section temperature sensor 57 is lower than the temperature which is obtained by adding a reference predetermined value (3 degrees C. in the present embodiment) to the temperature detected by the outdoor air temperature sensor 54 and the temperature detected by the outdoor liquid side linking section temperature sensor 57 is lower than a reference predetermined temperature (25 degrees C. in the present embodiment).

Excess cooling control in the indoor expansion valve 43 is performed by the indoor control section 40 controlling the valve opening of the indoor expansion valve 43 (subcooling control) so that a degree of subcooling of refrigerant flowing through the outlet of the indoor heat exchanger 41 (the gas side of the indoor heat exchanger 41 during heating operation) is maintained at a subcooling target value.

There are a heating normal target subcooling value which is used in normal heating control and a condensate formation suppressing subcooling target value which is used in condensate formation suppressing control which will be described later as the subcooling target value, and these are stored in advance in the indoor storage section 40*a* which is held in the indoor control section 40. Here, although not particularly limited, as heating normal target subcooling value which is used in normal heating control, for example, a range of 4 degrees to 8 degrees could be set in advance and 6 degrees is set in advance in the present embodiment.

In the present embodiment, the indoor control section 40 controls the opening degree of the indoor expansion valve 43 in such a way that a degree of subcooling at the outlet of the indoor heat exchanger 41 is maintained at the subcooling target value using the pressure detected by the indoor heat exchange gas side pressure sensor 61 and the temperature detected by the indoor heat exchange liquid side temperature sensor 58. Although not particularly limited, the indoor control section 40 controls the opening degree of the indoor expansion valve 43 in such a way that, in detail, a degree of subcooling, which is obtained by subtracting the temperature detected by the indoor heat exchange liquid side temperature sensor 58 from the refrigerant saturation temperature corresponding to the pressure detected by the indoor heat exchange gas side pressure sensor 61, is maintained at the subcooling target value.

In this manner, it is possible to increase the condensation capabilities by realizing the circumstances where heat exchange is efficiently performed in the indoor heat exchanger 41 due to subcooling control of the indoor expansion valve 43 being carried out during heating operation.

Then, the refrigerant which passes through the indoor expansion valve 43 passes through the liquid refrigerant communication pipe 5, the liquid side shut-off valve 28, and the second liquid refrigerant pipe 38. The refrigerant flowing through the second liquid refrigerant pipe 38 cools the electric component 70 when flowing through the electric component cooling section 38a.

The pressure of the refrigerant flowing through the electric component cooling section 38a is reduced to a low pressure in the refrigerant cycle in the outdoor expansion valve 24 and the refrigerant becomes refrigerant in a state of two phases of gas and liquid.

The reducing of pressure in the outdoor expansion valve 24 is performed by the outdoor control section 20 controlling the opening degree of the outdoor expansion valve 24 (superheat control) in such a way that a degree of superheat of refrigerant flowing through the outlet of the outdoor heat exchanger 23 (the gas side of the outdoor heat exchanger 23 and the suction side of the compressor 21 in heating operation) is maintained at heating normal target superheat (a predetermined normal superheat target value). The heating normal target superheat is stored in advance in the outdoor storage section 20a which is held in the outdoor control section 20. In the present embodiment, the outdoor control section 20 controls the opening degree of the outdoor expansion valve 24 in such a way that a degree of superheat at the outlet of the outdoor heat exchanger 23 is maintained at heating normal target superheat using the temperature detected by the outdoor heat exchange intermediate temperature sensor 55 and the temperature detected by the suction temperature sensor 51. Although not particularly limited, the outdoor control section 20 controls the opening degree of the outdoor expansion valve 24 in such a way that, in detail, a degree of superheat, which is obtained by subtracting the temperature detected by the outdoor heat exchange intermediate temperature sensor 55 from the temperature detected by the suction temperature sensor 51, is maintained at the heating normal target superheat.

In this manner, it is possible to increase the evaporation capabilities by realizing the circumstances where heat exchange is efficiently performed in the outdoor heat exchanger 23 due to superheat control of the outdoor expansion valve 24 being carried out during heating operation.

Then, the low-pressure refrigerant in a state of two phases of gas and liquid where the pressure is reduced by the outdoor expansion valve 24 becomes low-pressure gas refrigerant in the outdoor heat exchanger 23 due to evaporation by performing heat exchange with outdoor air which is supplied as a source for heating using the outdoor fan 36.

The low-pressure refrigerant which evaporates in the outdoor heat exchanger 23 is suctioned again into the compressor 21 via the four way switching valve 22 and the gas and liquid separator 25.

(2-3) Defrost Operation

Defrost operation is performed in a case where a predetermined defrost start condition (for example, a condition such as a case where the temperature detected by the outdoor air temperature sensor 54 is equal to or less than a predetermined temperature) is satisfied, refrigerant cycle operation is performed in the same manner as cooling operation by switching the four way switching valve 22 to a cooling cycle state (the state which is indicated by the solid line in FIG. 1) in the same manner as in cooling operation. Here, defrost operation is different to cooling operation and melting of frost which is attached to the outdoor heater exchanger 23 is promoted due to a state where the outdoor fan 36 is stopped.

(3) Condensate Formation Suppressing Control

In subcooling control of the indoor expansion valve 43 in normal heating operation (normal heating control mode) as described above, reducing of pressure of refrigerant is performed in the indoor expansion valve 43 (the pressure of refrigerant is reduced at least at a position in the indoor expansion valve 43 compared to an example where reducing of pressure is not carried out due to the indoor expansion valve being bypassed as in the techniques in the background art described in Patent Document 1) by controlling the opening degree of the indoor expansion valve 43 in order to increase the efficiency of condensation in the indoor heat exchanger 41. However, the temperature of refrigerant which passes through the second indoor liquid side refrigerant pipe 45, the liquid refrigerant communication pipe 5, and the second liquid refrigerant pipe 38 is lower when reducing of pressure is performed using the indoor expansion valve 43 during heating operation compared to a case where reducing of pressure is not performed in the indoor expansion valve 43. Due to this, there is a concern that there will be condensate formation on the outer surface of each pipe of the second indoor liquid side refrigerant pipe 45, the liquid refrigerant communication pipe 5, and the second liquid refrigerant pipe 38 due to circumstances of temperature and humidity in the surroundings. For this reason, there is a concern that condensate formation which is on the liquid refrigerant communication pipe 5 will become water droplets and drip down in a case where, for example, the liquid refrigerant communication pipe 5 is provided so as to pass through to the outdoors.

In contrast to this, generation of condensate formation is suppressed at a portion from the indoor expansion valve 43 to the outdoor expansion valve 24 by performing condensate formation suppressing control (condensate formation suppressing control mode) where the indoor control section 40 in the present embodiment controls so that the opening degree of the indoor expansion valve 43 is larger than the opening degree during normal heating control in a case where a condensate formation condition which relates to generation of condensate formation is satisfied at this portion in a case of performing subcooling control of the indoor expansion valve 43 in normal heating control (in normal heating control mode).

In condensate formation suppressing control, control is performed using a new condensate formation suppressing subcooling target value so that the subcooling target value in subcooling control of the indoor expansion valve 43 described above is smaller compared to heating normal target subcooling value during normal heating control and becomes a subcooling target value according to the temperature detected by the outdoor liquid side linking section temperature sensor 57. That is, in condensate formation suppressing control, the subcooling target value in subcooling control of the indoor expansion valve 43 is changed from heating normal target subcooling value to the condensate formation suppressing subcooling target value while being linked with the basic actions of normal heating control described above. Here, the condensate formation suppressing subcooling target value is not a certain value, is a value which is updated according to the temperature detected by the outdoor liquid side linking section temperature sensor 57 as will be described later, and is set so as to be a value which is smaller as the temperature detected by the outdoor liquid side linking section temperature sensor 57 is lower.

Here, the condensate formation condition is not particularly limited and a condition which is based on the outdoor air temperature and the temperature of refrigerant flowing through a portion, which is from the indoor expansion valve 43 to the outdoor expansion valve 24, in the refrigerant circuit 10 is used in the present embodiment. In detail, the outdoor control section 20 determines that the condensate formation condition is satisfied in the two following cases. The first case is where, in determining which the outdoor control section 20 performs over a predetermined long period of time (an interval of two minutes in the present embodiment) after starting subcooling control of the indoor expansion valve 43, the outdoor control section 20 sends a control command to the indoor control section 40 and the indoor control section 40 starts condensate formation suppressing control by the outdoor control section 20 determining that the condensate formation condition is satisfied in a case where the temperature detected by the outdoor liquid side linking section temperature sensor 57, which detects the temperature of refrigerant flowing through a portion, which is close to the liquid side shut-off valve 28, in the second liquid refrigerant pipe 38 where the temperature of refrigerant is substantially equal to the temperature of refrigerant flowing through the liquid refrigerant communication pipe 5, is equal to or less than the temperature which is obtained by adding the start predetermined value (5 degrees C. in the present embodiment) to the temperature detected by the outdoor air temperature sensor 54 and the temperature detected by the outdoor liquid side linking section temperature sensor 57 is equal to or less than the start predetermined temperature (27 degrees C. in the present embodiment). In addition, the second case is where, in determining which the outdoor control section 20 performs over a predetermined short period of time (an interval of one minute in the present embodiment) after starting subcooling control of the indoor expansion valve 43, the outdoor control section 20 sends a control command to the indoor control section 40 and the indoor control section 40 starts condensate formation suppressing control by the outdoor control section 20 determining that the condensate formation condition is satisfied also in a case where the temperature detected by the outdoor liquid side linking section temperature sensor 57 is equal to or less than the temperature which is obtained by adding a correction predetermined value (4 degrees C. in the present embodiment) to the temperature detected by the outdoor air temperature sensor 54 and the temperature detected by the outdoor liquid side linking section temperature sensor 57 is equal to or less than a correction predetermined temperature (26 degrees C. in the present embodiment).

Here, in condensate formation suppressing control, condensate formation suppressing control is stopped and there is a return to normal heating control in a case of the concern, that there will be condensate formation at a portion from the indoor expansion valve 43 and the outdoor expansion valve 24, becoming lower. In detail, in determining which the outdoor control section 20 performs over a predetermined long period of time (an interval of two minutes in the present embodiment) with circumstances where the condensate formation suppressing subcooling target value is set to a value which is one degree lower than heating normal target subcooling, the subcooling target value in subcooling control of the indoor expansion valve 43 is returned from the condensate formation suppressing subcooling target value to heating normal target subcooling value in a case where the temperature detected by the outdoor liquid side linking section temperature sensor 57 is higher than the temperature which is obtained by adding a return predetermined value (5 degrees C. in the present embodiment which is the same as the start predetermined value) to the temperature detected by the outdoor air temperature sensor 54 and the temperature detected by the outdoor liquid side linking section temperature sensor 57 exceeds a return predetermined temperature (27 degrees C. in the present embodiment which is the same as the start predetermined temperature).

(4) Control for Opening Degree of Indoor Expansion Valve

Figure 3:
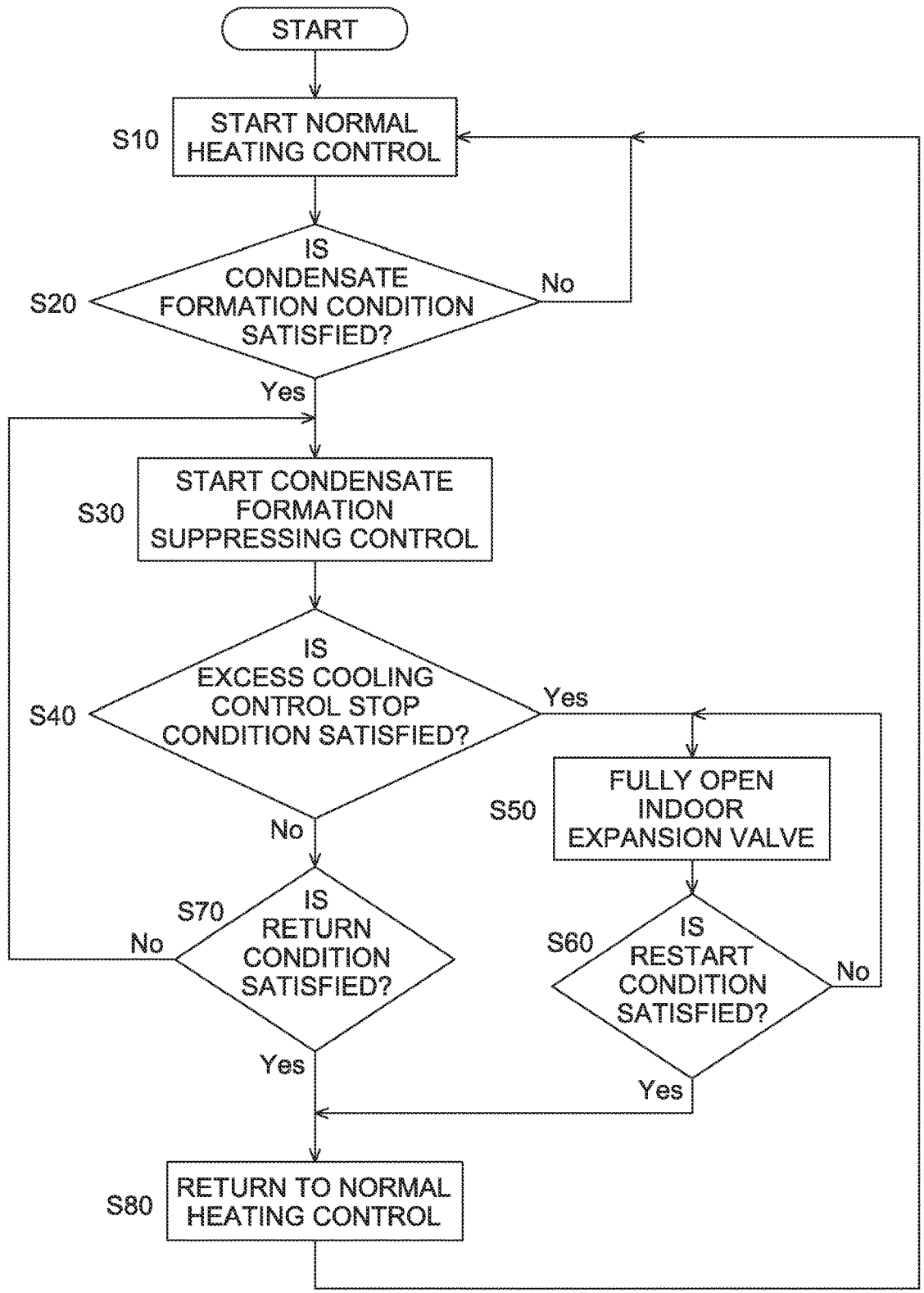
FIG. 3 is a control flow chart for the indoor expansion valve.

One example of control for opening degree of the indoor expansion valve 43 in normal heating control and condensate formation suppressing control will be described next based on the flow chart which is shown in FIG. 3. In the following description, processing by the outdoor control section 20 and processing by the indoor control section 40 will be described without being distinguished as processing which is performed by the control section 8 which has the outdoor control section 20 and the indoor control section 40, and detailed processing is as described above and processing is performed by each of the outdoor control section 20 and the indoor control section 40.

In step S10, the control section 8 starts normal heating control while performing subcooling control of the indoor expansion valve 43 in a case where the temperature detected by the outdoor liquid side linking section temperature sensor 57 is higher than the temperature which is obtained by adding the start predetermined value (5 degrees C. in the present embodiment) to the temperature detected by the outdoor air temperature sensor 54 and the temperature detected by the outdoor liquid side linking section temperature sensor 57 exceeds the start predetermined temperature (27 degrees C. in the present embodiment). In detail, the compressor 21 is driven and subcooling control is performed to the indoor expansion valve 43 so that a degree of subcooling of refrigerant flowing between the indoor heat exchanger 41 and the indoor expansion valve 43 becomes heating normal target subcooling value (the predetermined normal subcooling target value). That is, the control section 8 controls the opening degree of the indoor expansion valve 43 in such a way that a degree of subcooling, which is obtained by subtracting the temperature detected by the indoor heat exchange liquid side temperature sensor 58 from the refrigerant saturation temperature corresponding to the pressure detected by the indoor heat exchange gas side pressure sensor 61, is maintained at heating normal target subcooling value which is set in advance as a value where it is possible for the indoor heat exchanger 41 to be efficiently used. Due to this, it is possible for the indoor heat exchanger 41 to be efficiently used.

In step S20, the control section 8 determines whether or not there is a state where the condensate formation condition is satisfied. In detail, in determining which the control section 8 performs over a predetermined long period of time (an interval of two minutes in the present embodiment) after step S10, the control section 8 determines that the condensate formation condition is satisfied in a case where the temperature detected by the outdoor liquid side linking section temperature sensor 57 is equal to or less than a start determining temperature which is obtained by adding the start predetermined value (5 degrees C. in the present embodiment) to the temperature detected by the outdoor air temperature sensor 54 or the temperature detected by the outdoor liquid side linking section temperature sensor 57 is equal to or less than the start predetermined temperature (27 degrees C. in the present embodiment), and in determining which the control section 8 performs over a predetermined short period of time (an interval of one minute in the present embodiment) after step S10, the control section 8 determines that the condensate formation condition is satisfied also in a case where the temperature detected by the outdoor liquid side linking section temperature sensor 57 is equal to or less than a correction determining temperature which is obtained by adding the correction predetermined value (4 degrees C. in the present embodiment) to the temperature detected by the outdoor air temperature sensor 54 or the temperature detected by the outdoor liquid side linking section temperature sensor 57 is equal to or less than the correction predetermined temperature (26 degrees C. in the present embodiment).

The flow moves to step S30 in a case where it is determined that the condensate formation condition is satisfied and the flow reverts to step S10 in a case where it is not determined that the condensate formation condition is satisfied.

In step S30, the control section 8 starts condensate formation suppressing control. In condensate formation suppressing control, the control section 8 performs subcooling control of the indoor expansion valve 43 using the condensate formation suppressing subcooling target value so that the subcooling target value in subcooling control of the indoor expansion valve 43 is smaller compared to heating normal target subcooling value during normal heating control and becomes the subcooling target value according to the temperature detected by the outdoor liquid side linking section temperature sensor 57 (so that the subcooling target value is smaller as the temperature detected by the outdoor liquid side linking section temperature sensor 57 is lower) while linking with the basic actions of normal heating control described above. Due to this, it is possible to suppress condensate formation while only slightly lowering the efficiency of condensation in the indoor heat exchanger 41.

In detail, in determining which the control section 8 performs over a predetermined long period of time (an interval of two minutes in the present embodiment) described above, subcooling control of the indoor expansion valve 43 is performed using a value which is only one degree lower than heating normal target subcooling value as the condensate formation suppressing subcooling target value in a case where the control section 8 determines that the temperature detected by the outdoor liquid side linking section temperature sensor 57 is equal to or less than the start determining temperature which is obtained by adding the start predetermined value (5 degrees C. in the present embodiment) to the temperature detected by the outdoor air temperature sensor 54 or the temperature detected by the outdoor liquid side linking section temperature sensor 57 is equal to or less than the start predetermined temperature (27 degrees C. in the present embodiment). In addition, in determining which the control section 8 performs over a predetermined short period of time (an interval of one minute in the present embodiment) described above, subcooling control of the indoor expansion valve 43 is performed using a value which is only one degree lower than heating normal target subcooling value as the condensate formation suppressing subcooling target value in the same manner also in a case where the control section 8 determines that the temperature detected by the outdoor liquid side linking section temperature sensor 57 is equal to or less than the correction determining temperature which is obtained by adding the correction predetermined value (4 degrees C. in the present embodiment) to the temperature detected by the outdoor air temperature sensor 54 or the temperature detected by the outdoor liquid side linking section temperature sensor 57 is equal to or less than the correction predetermined temperature (26 degrees C. in the present embodiment).

Here, when subcooling control of the indoor expansion valve 43 is performed using the condensate formation suppressing subcooling target value in this manner, in determining which the control section 8 performs over a predetermined long period of time (an interval of two minutes in the present embodiment) described above, subcooling control of the indoor expansion valve 43 is performed using a value which is only one more degree lower than the condensate formation suppressing subcooling target value at that point in time as the updated condensate formation suppressing subcooling target value each time when the control section 8 determines that the temperature detected by the outdoor liquid side linking section temperature sensor 57 is equal to or less than the start determining temperature which is obtained by adding the start predetermined value to the temperature detected by the outdoor air temperature sensor 54 or the temperature detected by the outdoor liquid side linking section temperature sensor 57 is equal to or less than the start predetermined temperature. In the same manner, when subcooling control of the indoor expansion valve 43 is performed using the condensate formation suppressing subcooling target value, in determining which the control section 8 performs over a predetermined short period of time (an interval of one minute in the present embodiment) described above, subcooling control of the indoor expansion valve 43 is performed using a value which is only one more degree lower than the condensate formation suppressing subcooling target value at that point in time as the updated condensate formation suppressing subcooling target value in the same manner also in a case where the control section 8 determines that the temperature detected by the outdoor liquid side linking section temperature sensor 57 is equal to or less than the correction determining temperature which is obtained by adding the correction predetermined value to the temperature detected by the outdoor air temperature sensor 54 or the temperature detected by the outdoor liquid side linking section temperature sensor 57 is equal to or less than the correction predetermined temperature.

In addition, when subcooling control of the indoor expansion valve 43 is performed using the condensate formation suppressing subcooling target value in this manner, in determining which the control section 8 performs over a predetermined long period of time (an interval of two minutes in the present embodiment) described above, subcooling control of the indoor expansion valve 43 is performed using a value which is only one degree higher than the condensate formation suppressing subcooling target value at that point in time as the updated condensate formation suppressing subcooling target value in order to prioritize the efficiency of condensation in the indoor heat exchanger 41 due to circumstances where it is difficult for there to be condensate formation in a case where the control section 8 determines that the temperature detected by the outdoor liquid side linking section temperature sensor 57 is higher than the start determining temperature which is obtained by adding the start predetermined value (5 degrees C. in the present embodiment) to the temperature detected by the outdoor air temperature sensor 54 and the temperature detected by the outdoor liquid side linking section temperature sensor 57 exceeds the start predetermined temperature (27 degrees C. in the present embodiment).

In this manner, in condensate formation suppressing control, subcooling control of the indoor expansion valve 43 is performed using the condensate formation suppressing subcooling target value which is temporarily updated so that the subcooling target value in subcooling control of the indoor expansion valve 43 is smaller as the temperature detected by the outdoor liquid side linking section temperature sensor 57 is lower while the subcooling target value is smaller compared to heating normal target subcooling value during normal heating control.

The flow moves to step S40 after the processing above is performed over a predetermined period of time.

In step S40, the control section 8 determines whether or not the subcooling control stop condition is satisfied. That is, it is determined whether or not to finally stop subcooling control of the indoor expansion valve 43 since it is difficult for condensate formation to be suppressed by only performing condensate formation suppressing control. In detail, the control section 8 determines whether or not the subcooling control stop condition is satisfied such that the temperature detected by the outdoor liquid side linking section temperature sensor 57 is lower than a stop reference temperature which is obtained by adding a reference predetermined value (3 degrees C. in the present embodiment) to the temperature detected by the outdoor air temperature sensor 54 or the temperature detected by the outdoor liquid side linking section temperature sensor 57 is lower than the reference predetermined temperature (25 degrees C. in the present embodiment). The flow moves to step S50 in a case where it is determined that the subcooling control stop condition is satisfied. The flow moves to step S70 in a case where it is not determined that the subcooling control stop condition is satisfied.

In step S50, the control section 8 links with heating operation by stopping subcooling control and controlling the opening degree of the indoor expansion valve 43 to be fully open. After this, the flow moves to step S60.

In step S60, the control section 8 determines whether or not a restart condition is satisfied in order for subcooling control to be restarted. That is, it is determined whether or not the possibility that there will be condensate formation is lowered due to subcooling control being stopped and the subcooling control of the indoor expansion valve 43 is to be restarted in order to increase the efficiency of condensation in the indoor heat exchanger 41. In detail, in determining which the control section 8 performs over a predetermined long period of time (an interval of two minutes in the present embodiment) described above, it is determined that the restart condition is satisfied and the flow moves to step S80 in a case where the temperature detected by the outdoor liquid side linking section temperature sensor 57 is higher than the temperature which is obtained by adding a restart predetermined value (5 degrees C. in the present embodiment which is the same as the start predetermined value) to the temperature detected by the outdoor air temperature sensor 54 and the temperature detected by the outdoor liquid side linking section temperature sensor 57 exceeds a restart predetermined temperature (27 degrees C. in the present embodiment which is the same as the start predetermined temperature). Here, the flow reverts to step S50 in a case where it is not determined that the restart condition is satisfied.

In step S70, the control section 8 determines whether or not the return condition is satisfied in order to return to normal heating control by stopping condensate formation suppressing control. That is, it is determined whether or not to return the subcooling target value in subcooling control of the indoor expansion valve 43 from the condensate formation suppressing subcooling target value to heating normal target subcooling. In detail, in determining which the control section 8 performs over a predetermined long period of time (an interval of two minutes in the present embodiment) in circumstances where the condensate formation suppressing subcooling target value which is temporarily updated is smaller by one degree than heating normal target subcooling, it is determined that the return condition is satisfied and the flow moves to step S80 in a case where the temperature detected by the outdoor liquid side linking section temperature sensor 57 is higher than the return reference temperature which is obtained by adding the return predetermined value (5 degrees C. in the present embodiment which is the same as the start predetermined value) to the temperature detected by the outdoor air temperature sensor 54 and the temperature detected by the outdoor liquid side linking section temperature sensor 57 exceeds the return predetermined temperature (27 degrees C. in the present embodiment which is the same as the start predetermined temperature). Here, the flow reverts to step S30 in a case where it is not determined that the return condition is satisfied.

In step S80, the control section 8 returns the subcooling target value in subcooling control of the indoor expansion valve 43 from the condensate formation suppressing subcooling target value to heating normal target subcooling value and performs normal heating control. Then, the flow reverts to step S10.

(5) Characteristics of Air Conditioner (5-1)

In the air conditioner 1, an electric expansion valve, where it is possible for the opening degree to be controlled, is used as the indoor expansion valve 43. For this reason, it is possible to increase the efficiency of refrigerant condensation in the indoor heat exchanger 41 by adjusting subcooling of refrigerant flowing through the outlet of the indoor heat exchanger 41 during heating operation.

Here, the temperature of refrigerant after having passed through the indoor expansion valve 43 is lowered due to reducing of pressure of refrigerant being performed by the indoor expansion valve 43 compared to a case where reducing of pressure is not performed by the indoor expansion valve 43. When the temperature of refrigerant which passes through the indoor expansion valve 43 is lowered in this manner, there is a concern that there will be condensate formation on the second indoor liquid side refrigerant pipe 45, the liquid refrigerant communication pipe 5, and the second liquid refrigerant pipe 38, in which refrigerant flows after having passed through the indoor expansion valve 43, due to the surrounding environmental conditions.

In contrast to this, in the air conditioner 1, the control section 8 performs the condensate formation suppressing control where the control opening degree of the indoor expansion valve 43 is increased compared to subcooling control of the indoor expansion valve 43 in the normal heating control in a case where the condensate formation condition, which relates to generation of condensate formation on the second indoor liquid side refrigerant pipe 45, the liquid refrigerant communication pipe 5, and the second liquid refrigerant pipe 38, is satisfied.

Due to this, it is possible to suppress generation of condensate formation on the second indoor liquid side refrigerant pipe 45, the liquid refrigerant communication pipe 5, and the second liquid refrigerant pipe 38 since the extent of the reducing of pressure of refrigerant in the indoor expansion valve 43 is suppressed to be small even in circumstances where the condensate formation condition is satisfied. For this reason, it is possible to suppress water from condensate formation which is on the outer surface of the liquid refrigerant communication pipe 5 from dripping down even when the liquid refrigerant communication pipe 5 which is not covered by an insulation material or the like is provided so as to pass through to the outside. In addition, it is possible to also suppress generation of condensate formation on the electrical component cooling section 38a which is for cooling the electrical component 70 and it is possible that the electrical component 70 is not affected by moisture since it is possible to also suppress generation of condensate formation on the second liquid refrigerant pipe 38.

(5-2)

In addition, in the air conditioner 1, the condensate formation suppressing subcooling target value, which is used as the control target value for the indoor expansion valve 43 when performing condensate formation suppressing control, is updated to a value which is smaller when the temperature detected by the outdoor liquid side linking section temperature sensor 57 is lower and subcooling control is continuous without the indoor expansion valve 43 being fully opened. For this reason, it is possible to maintain the condensation capabilities of the indoor heat exchanger 41 to be as high as possible by keeping adjusting of the condensate formation suppressing subcooling target value, which is for suppressing condensate formation, to what is necessary according to the circumstances where it is likely that there will be condensate formation on the second indoor liquid side refrigerant pipe 45, the liquid refrigerant communication pipe 5, and the second liquid refrigerant pipe 38.

Moreover, in the air conditioner 1, it is possible to more reliably suppress generation of condensate formation due to the indoor expansion valve 43 being fully open by stopping subcooling control of the indoor expansion valve 43 when there are circumstances where it is not possible to sufficiently suppress condensate formation on the second indoor liquid side refrigerant pipe 45, the liquid refrigerant communication pipe 5, and the second liquid refrigerant pipe 38 by only performing condensate formation suppressing control.

(5-3)

In addition, in the air conditioner 1, it is possible for normal heating control to be restarted again due to the predetermined condition being satisfied even in a case of moving from normal heating control to condensate formation suppressing control and in a case where the indoor expansion valve 43 is fully open.

(5-4)

In addition, in air conditioner 1, an amount of refrigerant, where it is possible for the coefficient of performance during cooling operation to be optimal in a case where operation is performed under conditions where the cooling load during cooling operation and the heating load during heating operation are substantially the same, is filled into the refrigerant circuit 10. For this reason, operation is performed during heating operation in a state where there is a tendency for gas to be lacking compared to during cooling operation. Accordingly, when supposing that operation is performed by carrying out superheat control of the outdoor expansion valve with an amount of refrigerant which gives priority to cooling in this manner is filled into an air conditioner in the background art (an air conditioner which is not provided with an electric expansion valve at the outlet of the indoor heat exchanger during heating operation), it is difficult for there to be subcooling of refrigerant flowing through the outlet of the indoor heat exchanger and it is not possible for the indoor heat exchanger to be used efficiently.

In contrast to this, in the air conditioner 1 of the present embodiment, the indoor expansion valve 43 is provided at the outlet side of the indoor heat exchanger 41 during heating operation, and it is possible to realize desired subcooling in subcooling of refrigerant flowing through the outlet of the indoor heat exchanger 41 and it is possible to increase the efficiency of condensation in the indoor heat exchanger 41 by carrying out subcooling control of the indoor expansion valve 43.

(6) Modified Examples (6-1) Modified Example A

The embodiment described above is described with an example of a case where the temperature detected by the outdoor liquid side linking section temperature sensor 57, which is for ascertaining the temperature of refrigerant flowing from the indoor expansion valve 43 to the outdoor expansion valve 24, is used in determining the condensate formation condition and the like.

However, the method for ascertaining the temperature of refrigerant flowing from the indoor expansion valve 43 to the outdoor expansion valve 24 is not limited to this.

Figure 4:
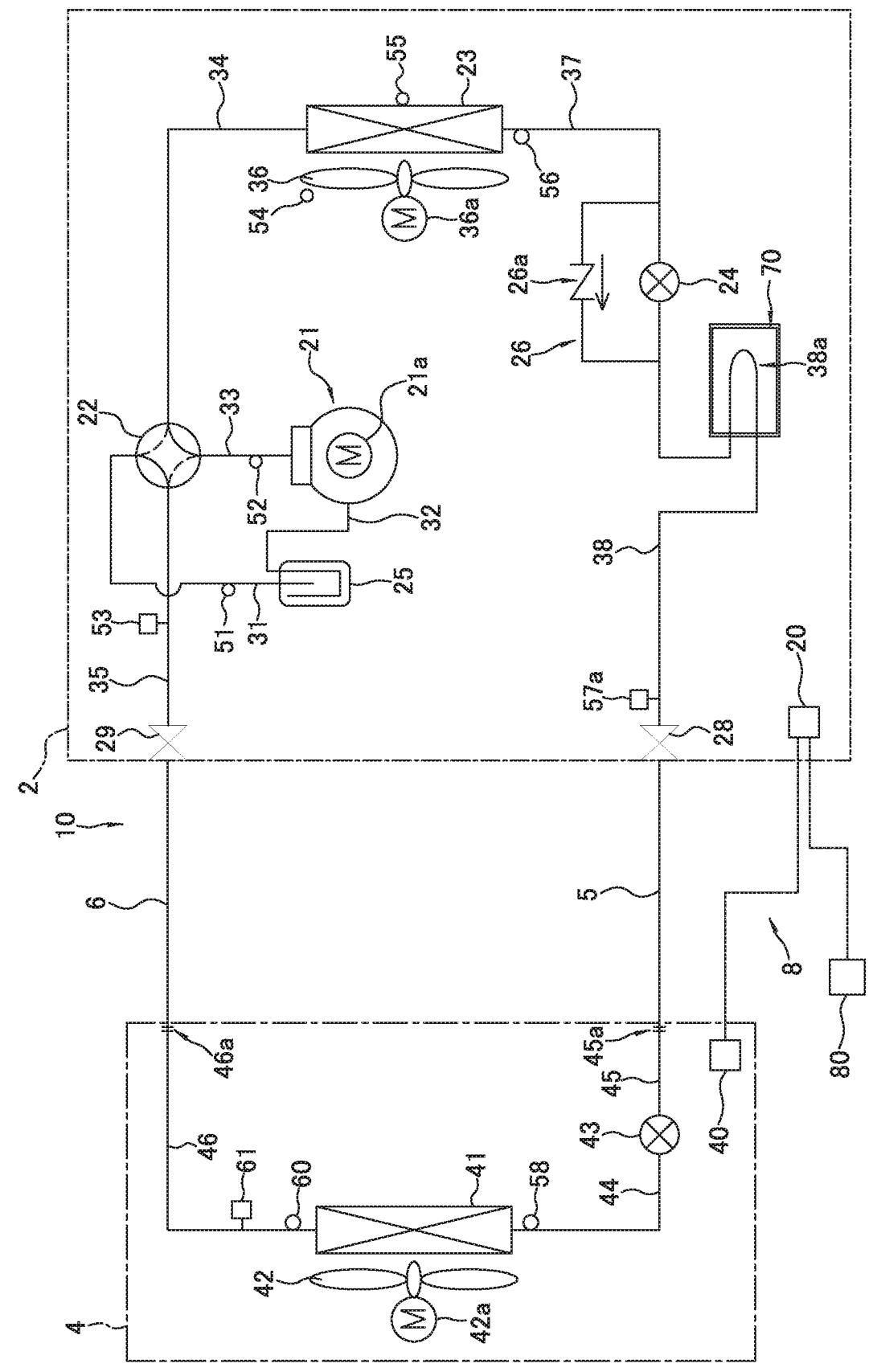
FIG. 4 is an outline configuration diagram of an air conditioner according to modified example (A).
Figure 5:
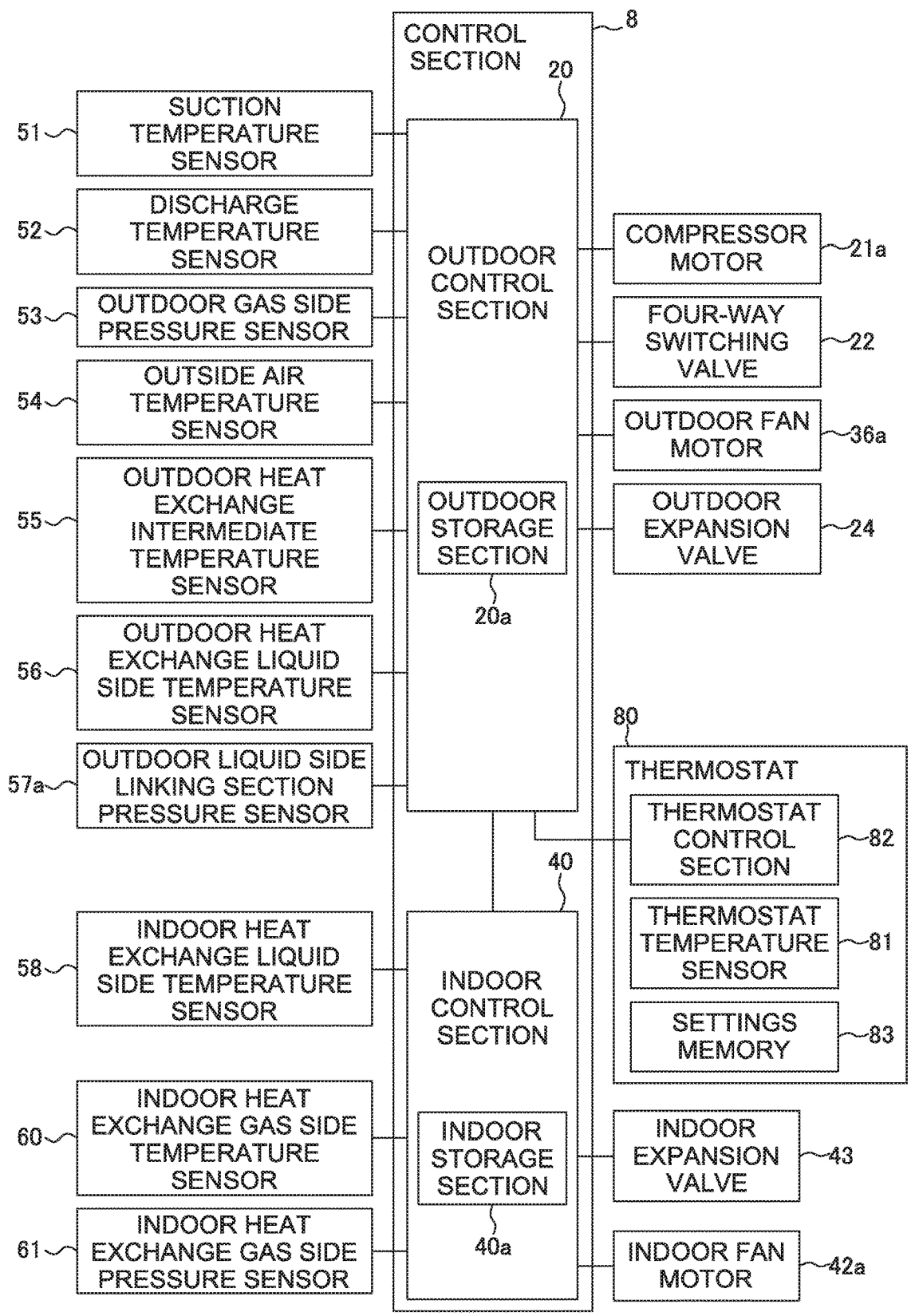
FIG. 5 is a control block diagram for the air conditioner according to modified example (A).

For example, an outdoor liquid side linking section pressure sensor 57a, which detects the pressure of refrigerant flowing through the second liquid refrigerant pipe 38, may be provided in the air conditioner 1 as show in FIG. 4 and FIG. 5 instead of the outdoor liquid side linking section temperature sensor 57 in the embodiment described above. In this case, assuming that refrigerant flowing through the second liquid refrigerant pipe 38 is in a saturated state, the saturation temperature corresponding to the pressure detected by the outdoor liquid side linking section pressure sensor 57a may be used as the temperature detected by the outdoor liquid side linking section temperature sensor 57 in the embodiment described above.

(6-2) Modified Example B

The embodiment described above is described with an example of a case where the temperature detected by the outdoor liquid side linking section temperature sensor 57 is used mainly in determining the condensate formation condition and the like with the aim of suppressing condensate formation on the liquid refrigerant communication pipe 5.

However, suppressing of condensate formation on the liquid refrigerant communication pipe 5 need not be the main aim and, for example, suppressing of condensate formation on the second indoor liquid side refrigerant pipe 45 may be the main aim.

Figure 6:
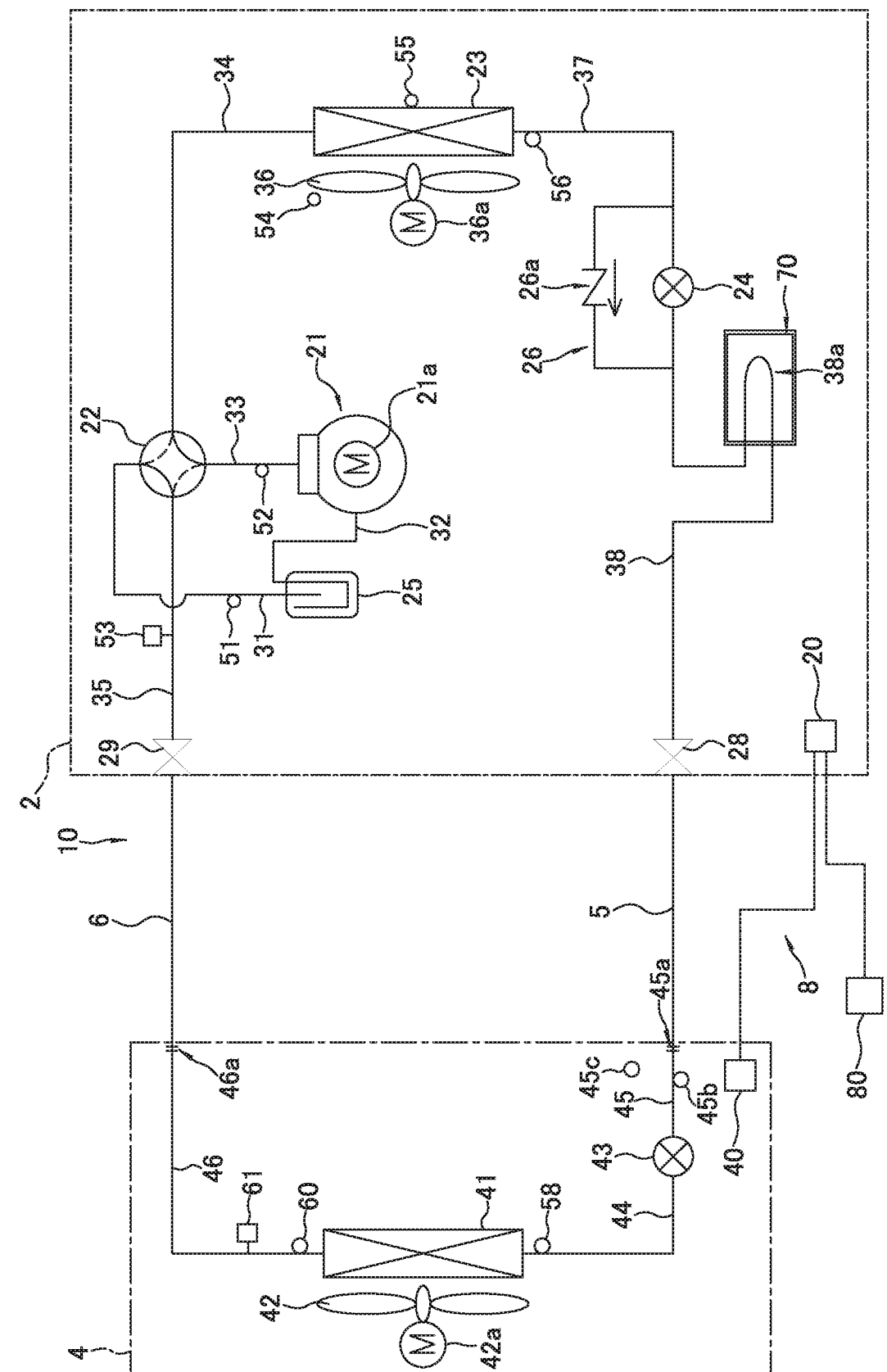
FIG. 6 is an outline configuration diagram of an air conditioner according to modified example (B).
Figure 7:
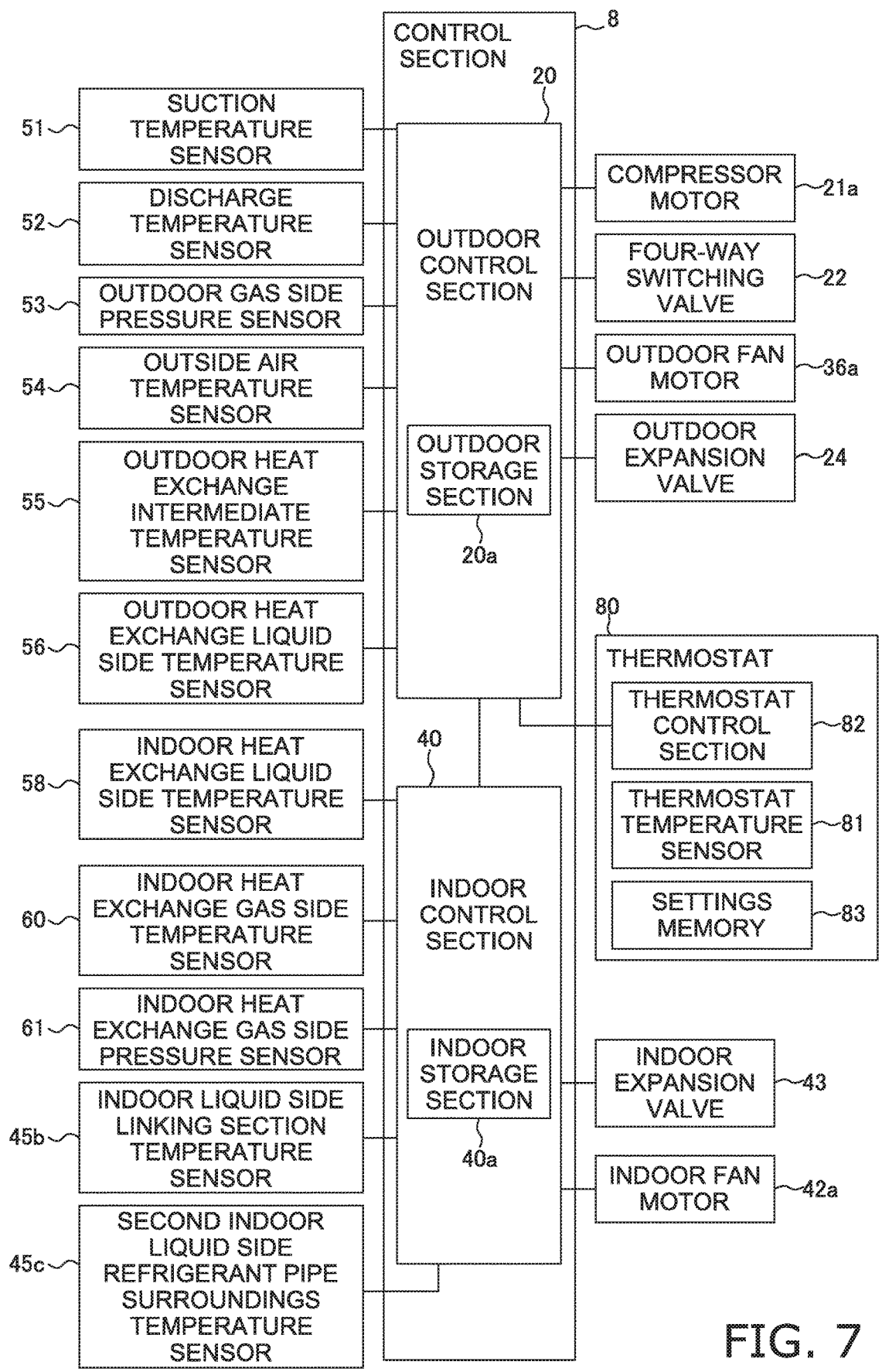
FIG. 7 is a control block diagram for the air conditioner according to modified example (B).

In this case, for example, an indoor liquid side linking section temperature sensor 45b, which detects the temperature of refrigerant flowing through the second indoor liquid side refrigerant pipe 45, may be provided in the air conditioner 1 as show in FIG. 6 and FIG. 7 instead of the outdoor liquid side linking section temperature sensor 57 in the embodiment described above, and a second indoor liquid side refrigerant pipe surroundings temperature sensor 45c (an indoor temperature sensor), which detects the temperature of the surroundings of the second indoor liquid side refrigerant pipe 45 which extends indoors, may be further provided. In this case, each type of determining may be performed using the temperature detected by the indoor liquid side linking section temperature sensor 45b instead of the temperature detected by the outdoor liquid side linking section temperature sensor 57 in the embodiment described above and using the temperature detected by the second indoor liquid side refrigerant pipe surroundings temperature sensor 45c instead of the temperature detected by the outdoor air temperature sensor 54 in the embodiment described above. Due to this, it is possible to effectively suppress condensate formation on the second indoor liquid side refrigerant pipe 45.

(6-3) Modified Example C

The embodiment described above is described with an example of a case where the temperature detected by the indoor heat exchange gas side temperature sensor 60 and the pressure detected by the indoor heat exchange gas side pressure sensor 61 are used when the indoor control section 40 carries out subcooling control of the indoor expansion valve 43 during heating operation.

In contrast to this, the method for calculating subcooling of refrigerant flowing through the outlet of the indoor heat exchanger 41 during heating operation is not limited to this.

Figure 8:
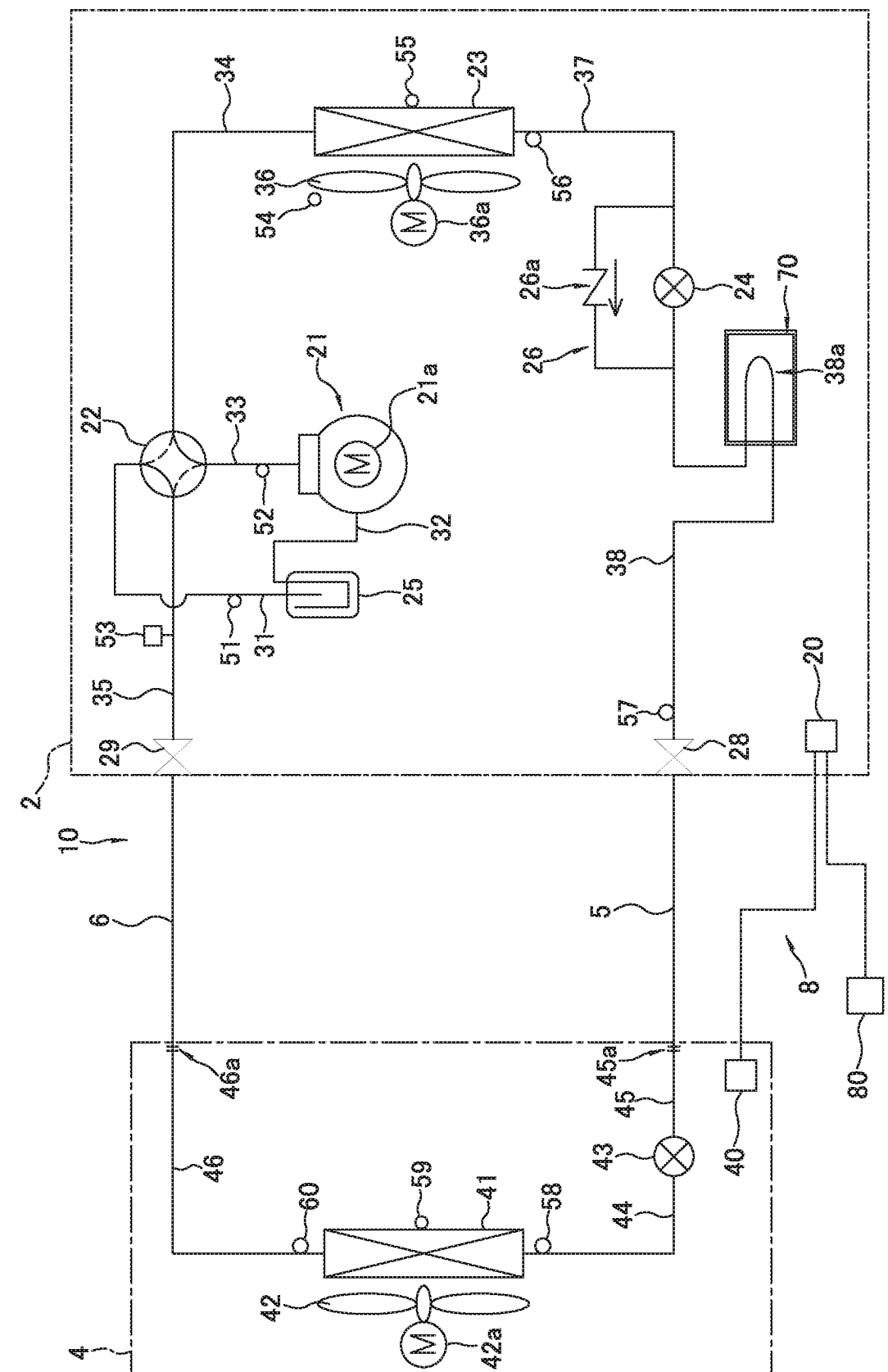
FIG. 8 is an outline configuration diagram of an air conditioner according to modified example (C).
Figure 9:
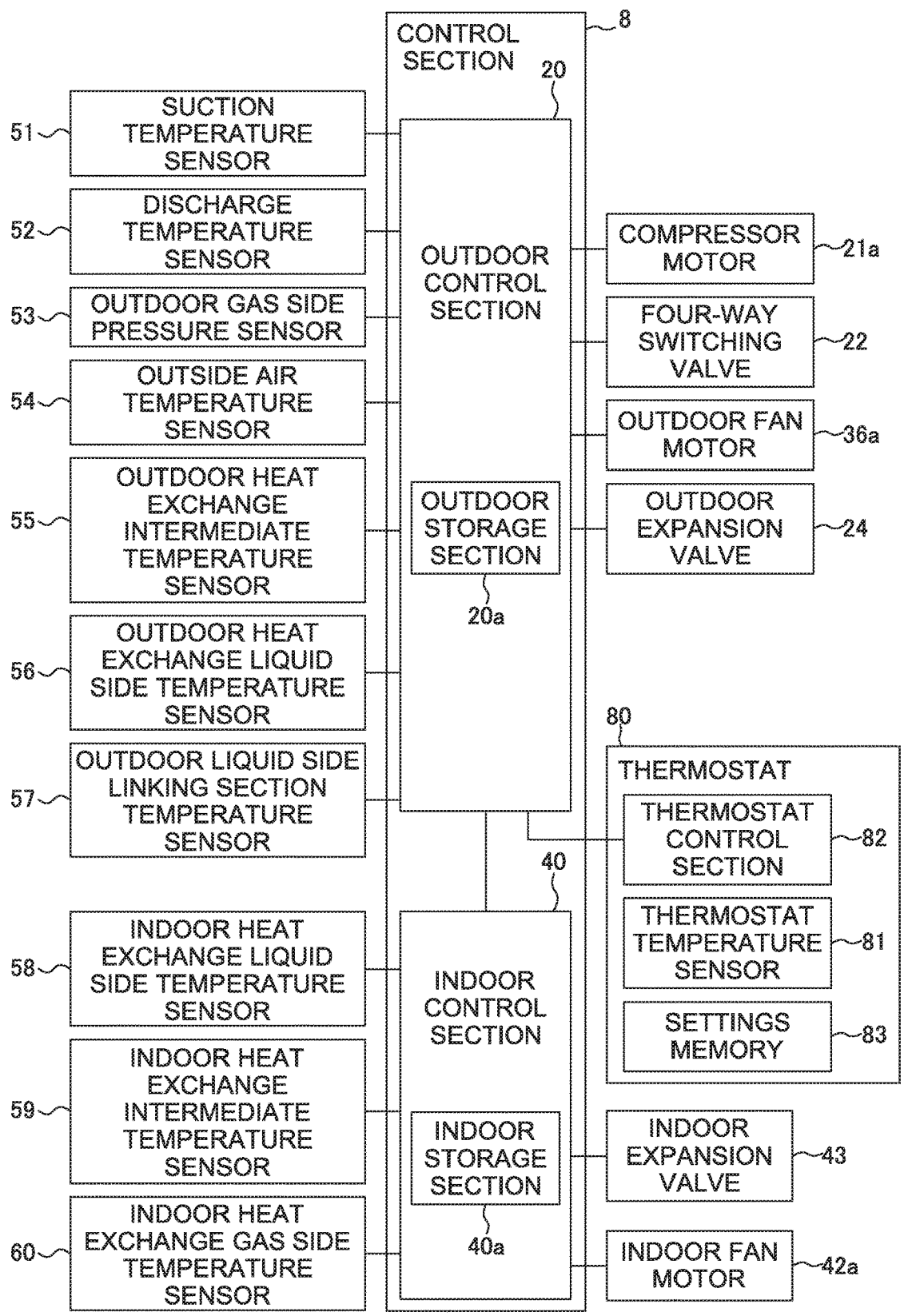
FIG. 9 is a control block diagram for the air conditioner according to modified example (C).

For example, an indoor heat exchange intermediate temperature sensor 59, which detects the temperature of refrigerant at an intermediate portion of the indoor heat exchanger 41, may be provided in the air conditioner 1 as show in FIG. 8 and FIG. 9 instead of the indoor heat exchange gas side pressure sensor 61 in the embodiment described above. In this case, it is possible to determine degree of subcooling at the outlet of the indoor heat exchanger 41 by subtracting the temperature detected by the indoor heat exchange gas side temperature sensor 60 from the temperature detected by the indoor heat exchange intermediate temperature sensor 59. Then, the control section 8 may be such that the indoor control section 40 performs control of the opening degree of the indoor expansion valve 43 so that the degree of subcooling is maintained at the heating normal target subcooling value or the condensate formation suppressing subcooling target value.

(6-4) Modified Example D

The embodiment described above is described with an example of a case where the outdoor expansion valve 24 is an electric expansion valve which is able to be controlled.

However, the outdoor expansion valve 24 is not limited to being configured using an electric expansion valve and may be configured using, for example, so-called a heat sensing type of expansion valve. In this case, although not limited to this, the opening degree of the heat sensing type of expansion valve may be adjusted so as to be similar to the embodiment described above by, for example, sensing the temperature of refrigerant in the gas and liquid separator introduction pipe 31.

(6-5) Modified Example E

The embodiment and modified example (B) described above are described with an example of a case where determining of the condensate formation condition and the like is performed using the temperature of the surroundings of the intended refrigerant pipe where there is an attempt to suppress generation of condensate formation.

In contrast to this, determining of the condensate formation condition and the like may be performed using, for example, the humidity of the surroundings in addition to the temperature of the surroundings. In this case, it is possible to ascertain the circumstances where there is condensate formation in a more detailer manner.

(7) Second Embodiment

The first embodiment and the modified example thereof are described with an example of control which includes the subcooling control of the indoor expansion valve 43 which is carried out when the subcooling control start condition is satisfied (the heating normal target subcooling value and the condensate formation suppressing subcooling target value are set as a target value in the control), and includes the control of the indoor expansion valve 43 to be fully open which is carried out when the subcooling control stop condition is satisfied without carrying out the subcooling control of the indoor expansion valve 43, both control being carried out with the compressor 21 kept operating in the heating operation.

In contrast to this, the air conditioner 1 of the second embodiment not only has the composition and control contents of the first embodiment and the modified example thereof, but has the control section 8 configured to perform forcibly stopping control which is performed when a predetermined stopping condition is satisfied in the heating operation (the normal heating control mode), the forcibly stopping control being a control that forcibly stops the compressor 21 (make the speed of rotations of the compressor to be 0). The control section 8 is also configured from the indoor control section 40 and the outdoor control section 20 as described above.

The forcibly stopping control is a control that the control section 8 forcibly stops the compressor 21 when the control section 8 judges it is likely that there will be condensate formation. The judgement of the possibility of generation of the condensate on the outer surface of the pipe in the heating operation because of the decreasing temperature of the second indoor liquid side refrigerant pipe 45, the liquid refrigerant communication pipe 5 and/or the second liquid refrigerant pipe 38 or the like is performed based on the predetermined stopping condition. In the judgement of the predetermined stopping condition, the control section 8 judges the possibility of generation of the condensate based on the comparing between outdoor air temperature and predicted temperature of refrigerant (predicted temperature of a liquid pipe) flowing through the second indoor liquid side refrigerant pipe 45, the liquid refrigerant communication pipe 5 and the second liquid refrigerant pipe 38 (these pipes are collectively called the liquid pipe).

In the following formula (2) used in the judgement of the predetermined stopping condition, the control section 8 uses the predicted temperature of the liquid pipe, which is obtained by subtracting a losing temperature from the temperature detected by the indoor heat exchange liquid side temperature sensor 58, as the temperature of refrigerant flowing through the liquid pipe in the following formula (2), and does not use an actual measured value (actual temperature of the liquid pipe) directly measured by the outdoor liquid side linking section temperature sensor 57 (or a value directly measured by the indoor liquid side linking section temperature sensor 45b or the saturation temperature corresponding to the pressure directly measured by the outdoor liquid side linking section pressure sensor 57a). Even though a part of the liquid pipe is wet by rain, the control section 8 can avoid using lower temperature as the temperature of refrigerant flowing through the liquid pipe, by using the predicted temperature of the liquid pipe which is predicted by using the temperature detected by the indoor heat exchange liquid side temperature sensor 58 detecting temperature of a portion which is not wet by rain because of the indoor location. Therefore, over frequent stopping of the compressor 21 faultily by the rain can be avoided.

Referring to the flow chart shown in FIG. 10, the forcibly stopping control is explained as follows.

In the following description, as described above, processing by the outdoor control section 20 and processing by the indoor control section 40 will be described without being distinguished as processing performed by the control section 8 which has the outdoor control section 20 and the indoor control section 40. Detailed processing is as described above and processing is performed by each of the outdoor control section 20 and the indoor control section 40. Specifically, ascertaining processing of the detected value detected by the indoor heat exchange liquid side temperature sensor 58 is performed by the indoor control section 40, and other processing is performed by the outdoor control section 20.

The forcibly stopping control is started after starting the heating operation of the air conditioner 1, and performed simultaneously and separately from the subcooling control of the indoor expansion valve 43 or the like. As described above, whether the heating operation is started is determined by the control section 8 based on the satisfaction of the heating operation condition.

In step S110, after starting the forcibly stopping control, the control section 8 determines whether the outdoor temperature detected by the outdoor air temperature sensor 54 is equal to 10 degree Celsius or more. The flow moves to step S120 in a case where the outdoor temperature is equal to 10 degree Celsius or more and the flow reverts to step S110 in a case where the outdoor temperature is not equal to 10 degree Celsius or more.

In step S120, the control section 8 determines whether a condition of formula (1) is satisfied. The formula (1) is temperature of the liquid pipe<outdoor temperature+revising value. In this formula (1), the temperature of the liquid pipe is an ascertained temperature as a detected value detected by the outdoor liquid side linking section temperature sensor 57 (the temperature of the liquid pipe may be saturation temperature corresponding to the pressure detected by the outdoor liquid side linking section pressure sensor 57a in case the outdoor liquid side linking section pressure sensor 57a is provided for example in the modified example A of the first embodiment, and the temperature of the liquid pipe may be detected temperature detected by the indoor liquid side linking section temperature sensor 45b in case the indoor liquid side linking section temperature sensor 45b is provided for example in the modified example B of the first embodiment). Although not limited to this, the revising value is preferably predetermined in view of an individual difference occurred at the time of manufacture of the product of the sensor and an accidental error of temperature sensing, and is preferably 1.5 in this embodiment. The flow moves to step S130 in a case where the control section 8 determines that the formula (1) is satisfied and the flow reverts to step S110 in a case where the control section 8 does not determine that the formula (1) is satisfied.

In step S130, the control section 8 determines whether a condition of formula (2) is satisfied. The formula (2) is the predicted temperature of the liquid pipe<outdoor temperature. In this formula (2), the predicted temperature of the liquid pipe is a predicted temperature of refrigerant flowing through a portion which is a target place to be suppressed the generation of the condensation in the liquid pipe, and is a temperature obtained by subtracting the losing temperature $\Delta T$ from the temperature detected by the indoor heat exchange liquid side temperature sensor 58.

The losing temperature $\Delta T$ is a temperature predetermined as a temperature that refrigerant supposedly loses during flowing from a position where the indoor heat exchange liquid side temperature sensor 58 is arranged between the indoor heat exchanger 41 and the indoor expansion valve 43 to a position which is the target place to be suppressed the generation of the condensation in the liquid pipe via the indoor expansion valve 43.

The losing temperature $\Delta T$ is predetermined as a value depended on the magnitude of refrigeration capacity (refrigeration ton) of the air conditioner 1 and the speed of rotations of the compressor 21. The losing temperature $\Delta T$ is preferably predetermined so as to be larger as the speed of rotations of the compressor 21 is larger because heat loss at the indoor expansion valve 43 and the refrigerant pipe tends to increase as the speed of rotations of the compressor 21 increases. However, the same value of the losing temperatures $\Delta T$ may be set in the different speed of rotations of the compressor 21. The losing temperature $\Delta T$ is preferably predetermined to be larger as a type of air conditioner whose permissible remained amount of refrigerant is smaller because heat loss at the indoor expansion valve 43 and the refrigerant pipe tends to increase as the volume of refrigerant filled in the refrigerant circuit 10 of the air conditioner 1 (rate of the prescribed volume of refrigerant) decreases. For example, to suppress the generation of the condensation at the liquid pipe even though the volume of filled refrigerant is reduced to the 70% of the prescribed volume of refrigerant in the air conditioner whose refrigeration capacity is 4 ton, the losing temperature $\Delta T$ in case the speed of rotations of the compressor 21 is maximum is set at 12.5, and the losing temperature $\Delta T$ in case the speed of rotations of the compressor 21 is medium is set at 11.5 or the like.

These losing temperatures $\Delta T$ is stored in the outdoor storage section 20a or the indoor storage section 40a.

The flow moves to step S140 in a case where the control section 8 determines that the formula (2) is satisfied and the flow reverts to step S110 in a case where the control section 8 does not determine that the formula (2) is satisfied.

In step S140, the control section 8 determines whether a predetermined judging time has elapsed in a state that both condition of the formula (1) and condition of the formula (2) are satisfied. Although not limited to this, the predetermined judging time is preferably longer than the above described predetermined short period of time and preferably longer than the above described predetermined long period of time, and is preferably 10 minutes in this embodiment. The flow moves to step S150 in a case where the control section 8 determines that the predetermined judging time has elapsed in a state that both condition of the formula (1) and condition of the formula (2) are satisfied and the flow reverts to step S110 in a case where the control section 8 determines that the predetermined judging time has not elapsed in a state that both condition of the formula (1) and condition of the formula (2) are satisfied.

In step S150, the control section 8 forcibly stops the compressor 21 (make the speed of rotations of the compressor to be 0). In step S150, the control section 8 forcibly stops the compressor 21 whether the normal heating control is performed, the condensate formation suppressing control is performed or the indoor expansion valve 43 is controlled to be fully open with stopping the subcooling control. Therefore, the generation of condensation at the outer surface of the second indoor liquid side refrigerant pipe 45, the liquid refrigerant communication pipe 5 and the second liquid refrigerant pipe 38 can be suppressed more certainly.

Figure 11:
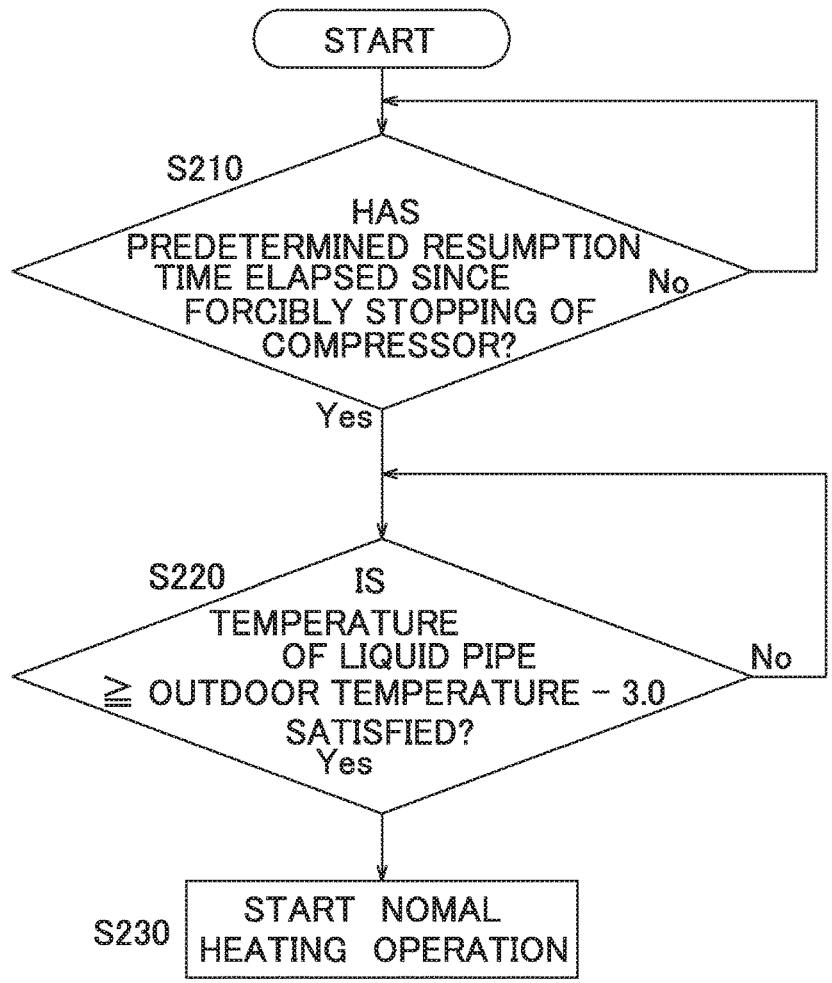
FIG. 11 is a control flow chart of an operation resumption control for the compressor of the air conditioner according to second embodiment.

After the forcible stop of the compressor 21, as shown in an operation resumption control flow chart of FIG. 11, the control section 8 determines whether to start the normal heating control by resuming the operation of the compressor 21.

In step S210, the control section 8 determines whether a predetermined resumption time has elapsed since forcible stop of the compressor 21. Although not limited to this, the predetermined resumption time is preferably 30 minutes in this embodiment. The flow moves to step S220 in a case where the control section 8 determines that the predetermined resumption time has elapsed since forcible stop of the compressor 21 and the flow reverts to step S210 in a case where the control section 8 determines that the predetermined resumption time has not elapsed since forcible stop of the compressor 21.

In step S220, the control section 8 determines whether a condition which the temperature of the liquid pipe≥outdoor temperature-3.0 (the temperature of the liquid pipe is equal to outdoor temperature-3.0 or more) is satisfied. The flow moves to step S230 in a case where the control section 8 determines that the condition which the temperature of the liquid pipe≥outdoor temperature-3.0 is satisfied. The control section 8 repeats the step S230 in a case where the control section 8 determines that the condition which the temperature of the liquid pipe≥outdoor temperature-3.0 is not satisfied.

In step S230, the control section 8 starts the normal heating control by resuming the operation of the compressor 21.

(8) Characteristics of Air Conditioner of the Second Embodiment

The air Conditioner 1 of the second embodiment has characteristics of the air Conditioner 1 of the first embodiment (or the modified examples thereof).

In the air Conditioner 1 of the second embodiment, the generation of condensation at the outer surface of the second indoor liquid side refrigerant pipe 45, the liquid refrigerant communication pipe 5 and the second liquid refrigerant pipe 38 can be suppressed more certainly because of the forcibly stopping control.

Specifically, the forcibly stopping control is carried out with the subcooling control of the indoor expansion valve 43. Then, in the state that the condensate formation condition is satisfied, the control section 8 carries out the subcooling control of the indoor expansion valve 43 by using the condensate formation suppressing subcooling target value, which is smaller than the heating normal target subcooling value in the normal heating control and is smaller as the temperature detected by the outdoor liquid side linking section temperature sensor 57 is lower. Then, even in the operation condition state that have a tendency to easily satisfy the predetermined stopping condition in case the normal heating control is carried out, it is possible for the air Conditioner 1 of the second embodiment to reduce the chance to satisfy the predetermined stopping condition by carrying out the condensate formation suppressing control mode, not by carrying out the normal heating control mode. Therefore, the compressor 21 can be kept operating without being stoped the operation of the compressor 21 as much as possible.

The indoor expansion valve 43 is controlled so that the opening degree is fully open by stopping the subcooling control, in case that the subcooling control stop condition is satisfied because of a possibility of generation of condensate even under the condensate formation suppressing control. Although not limited to this, for example, the forcibly stopping control which stops the operation of the compressor 21 may be carried out in case that there is a possibility of generation of condensate even under the control that the opening degree of the indoor expansion valve 43 is fully open. In this case, the heating operation with the compressor 21 kept operating can be continued longer with avoiding the forcibly stopping control caused by the frequent satisfaction of the predetermined stopping condition and with suppressing the generation of the condensate.

The predetermined stopping condition for the forcibly stopping control includes the condition of formula (2) in which the predicted temperature of the liquid pipe is used. Then, the predicted temperature of the liquid pipe is obtained by using both temperature detected by the indoor heat exchange liquid side temperature sensor 58 that does not get affected by changing temperature caused by rain and the losing temperature, even though the temperature of the outdoor side of the liquid pipe is decreased by wetting with rain. Therefore, the predetermined stopping condition can be judged more accurately by diminishing the influence of the temperature changing by rain.

The losing temperature is predetermined as a temperature that refrigerant supposedly loses during flowing from a position where the indoor heat exchange liquid side temperature sensor 58 is arranged to a position which is the target place to be suppressed the generation of the condensation in the liquid pipe via the indoor expansion valve 43. Furthermore, the losing temperature is predetermined as a value depended on the magnitude of refrigeration capacity (refrigeration ton) of the air conditioner 1 and the speed of rotations of the compressor 21. Then, the predicted temperature of the liquid pipe can be defined with high accuracy.

The predetermined stopping condition for the forcibly stopping control includes both the condition of formula (1) and the condition of formula (2). Then, the operation of the compressor 21 can be continued without carrying out the forcibly stopping control even in the situation that only one of the condition of formula (1) and the condition of formula (2) is satisfied. Specifically, the operation of the compressor 21 can be continued without being forcibly stopped the operation of the compressor 21 if the condition of formula (2) is not satisfied even though the condition of formula (1) is satisfied by the influence of the rain. Therefore, the compressor 21 can be kept operated as long time as possible with suppressing the generation of the condensate at the liquid pipe.

Furthermore, the forcibly stopping control is carried out only when all conditions including the condition of formula (1), the condition of formula (2) and the condition of elapsing the predetermined judging time with the condition of formula (1) and the condition of formula (2) satisfied are satisfied. Then, the frequent forcible stop of the compressor 21 can be avoided.

Using air conditioners having 4 ton of refrigeration capacity as examples, graphs of operation situations with several kind of the volume of filled refrigerant and the speed of rotations of the compressor 21 are described below.

Figure 12:
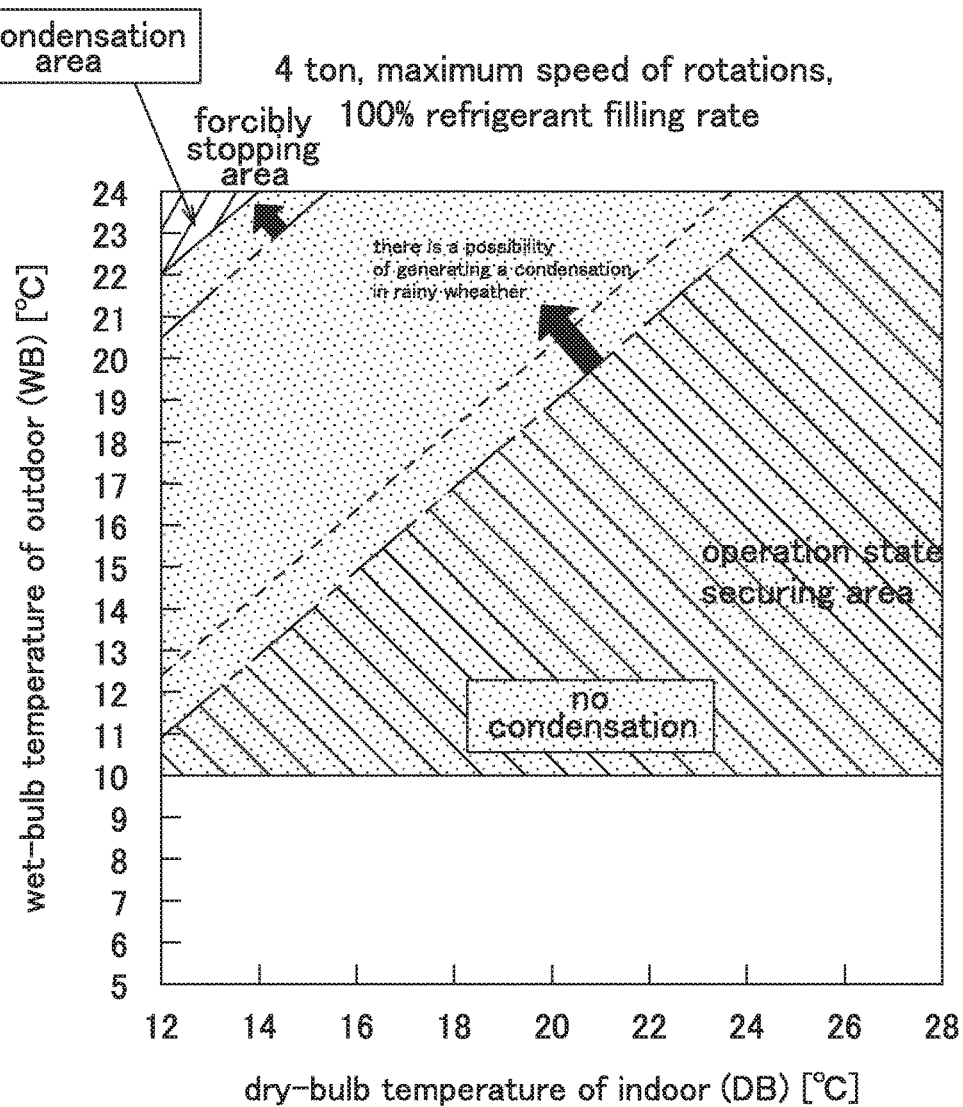
FIG. 12 is a graph showing operation situations in case that the speed of rotations of the compressor of the air conditioner in the second embodiment is maximum with 100% refrigerant filling rate.
Figure 12:
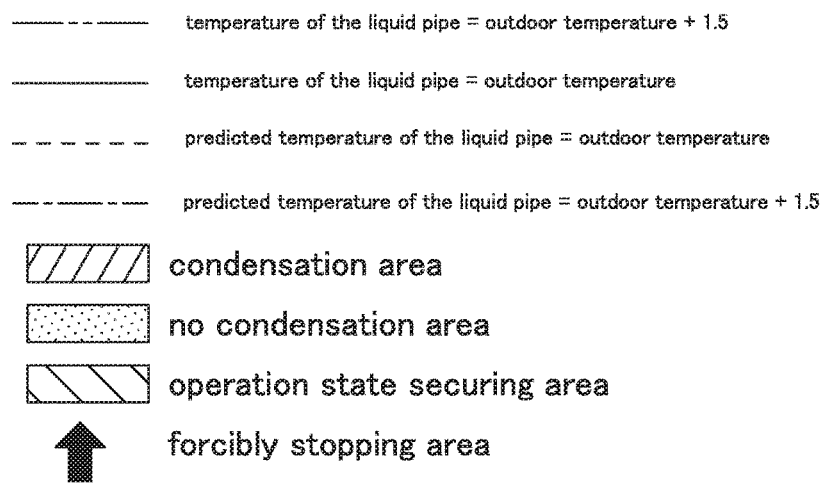
Figure 13:
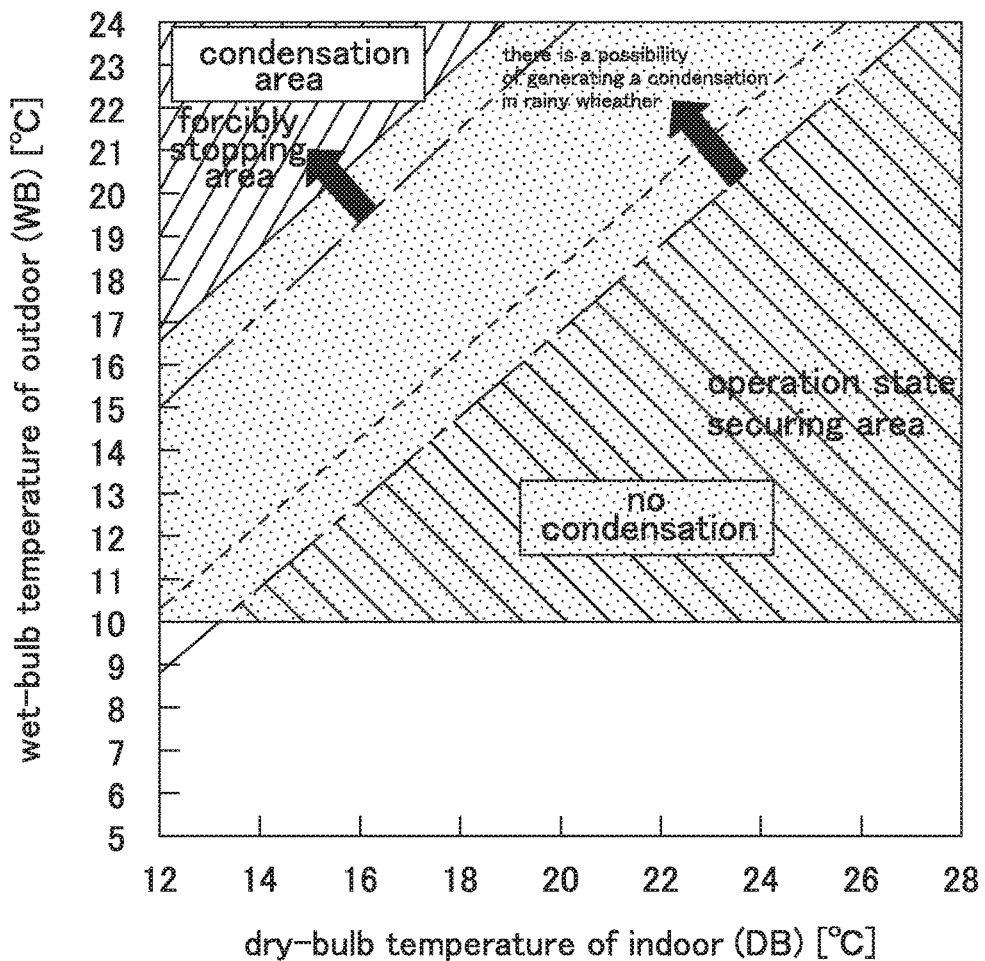
FIG. 13 is a graph showing operation situations in case that the speed of rotations of the compressor of the air conditioner in the second embodiment is medium with 100% refrigerant filling rate.
Figure 14:
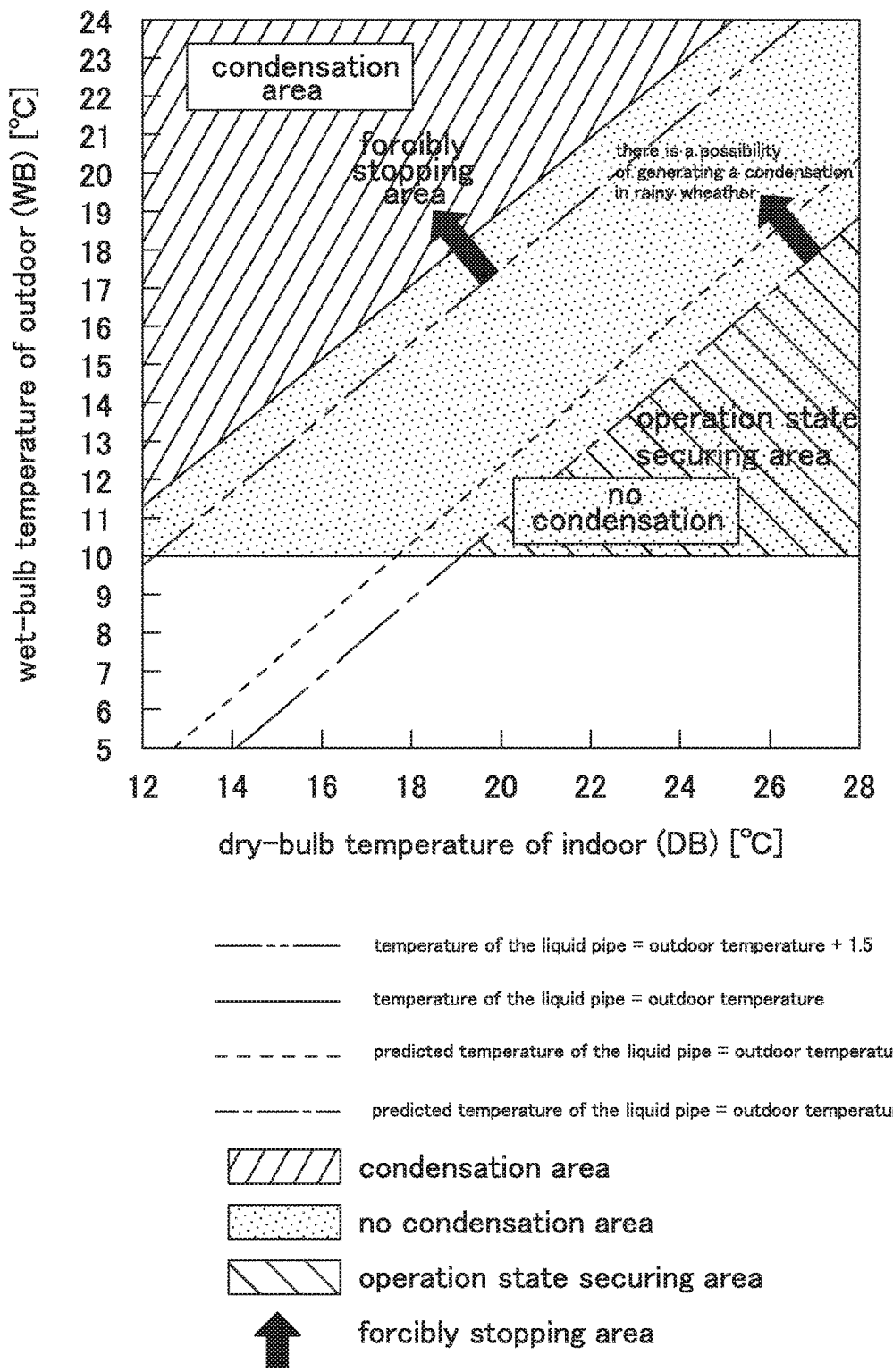
FIG. 14 is a graph showing operation situations in case that the speed of rotations of the compressor of the air conditioner in the second embodiment is minimum with 100% refrigerant filling rate.

In case that an air conditioner having 4 ton of refrigeration capacity and 100% of refrigerant filling rate (rate of the prescribed volume of refrigerant), an operation situation with the speed of rotations of the compressor 21 maximum, an operation situation with the speed of rotations of the compressor 21 medium and an operation situation with the speed of rotations of the compressor 21 minimum are shown in the graph of FIG. 12, the graph of FIG. 13 and the graph of FIG. 14 respectively.

Figure 15:
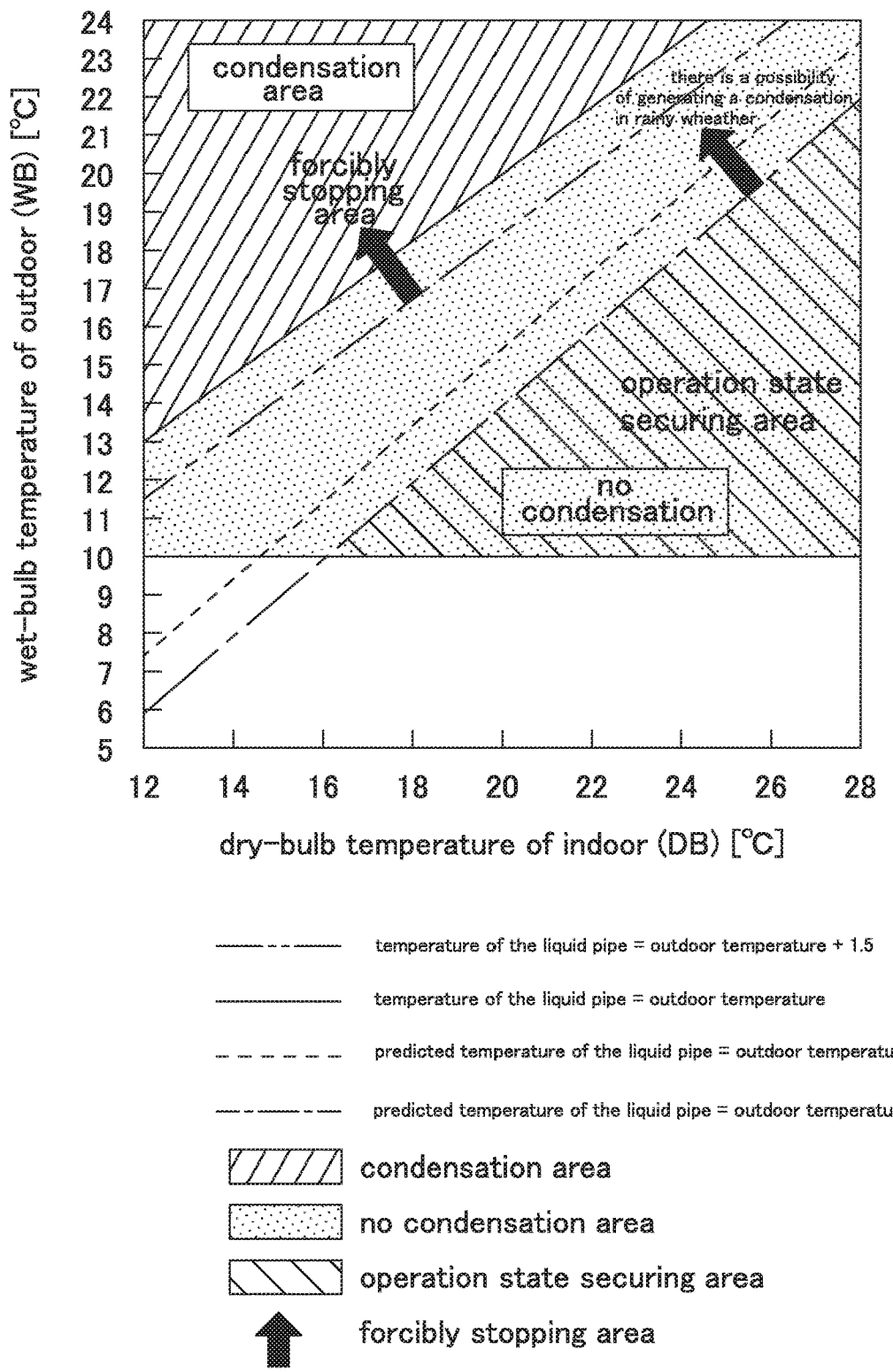
FIG. 15 is a graph showing operation situations in case that the speed of rotations of the compressor of the air conditioner in the second embodiment is maximum with 70% refrigerant filling rate.
Figure 16:
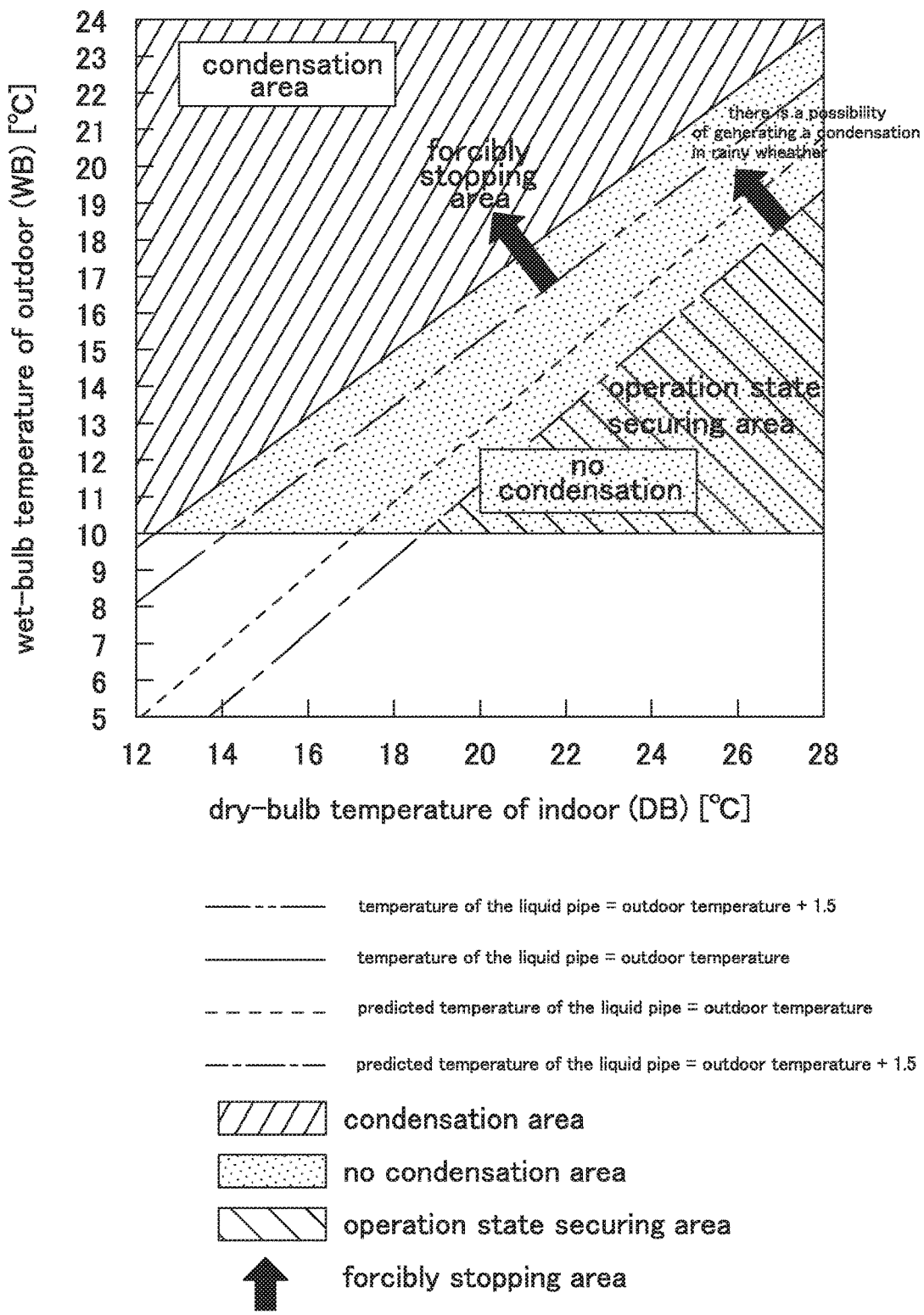
FIG. 16 is a graph showing operation situations in case that the speed of rotations of the compressor of the air conditioner in the second embodiment is medium with 70% refrigerant filling rate.
Figure 17:
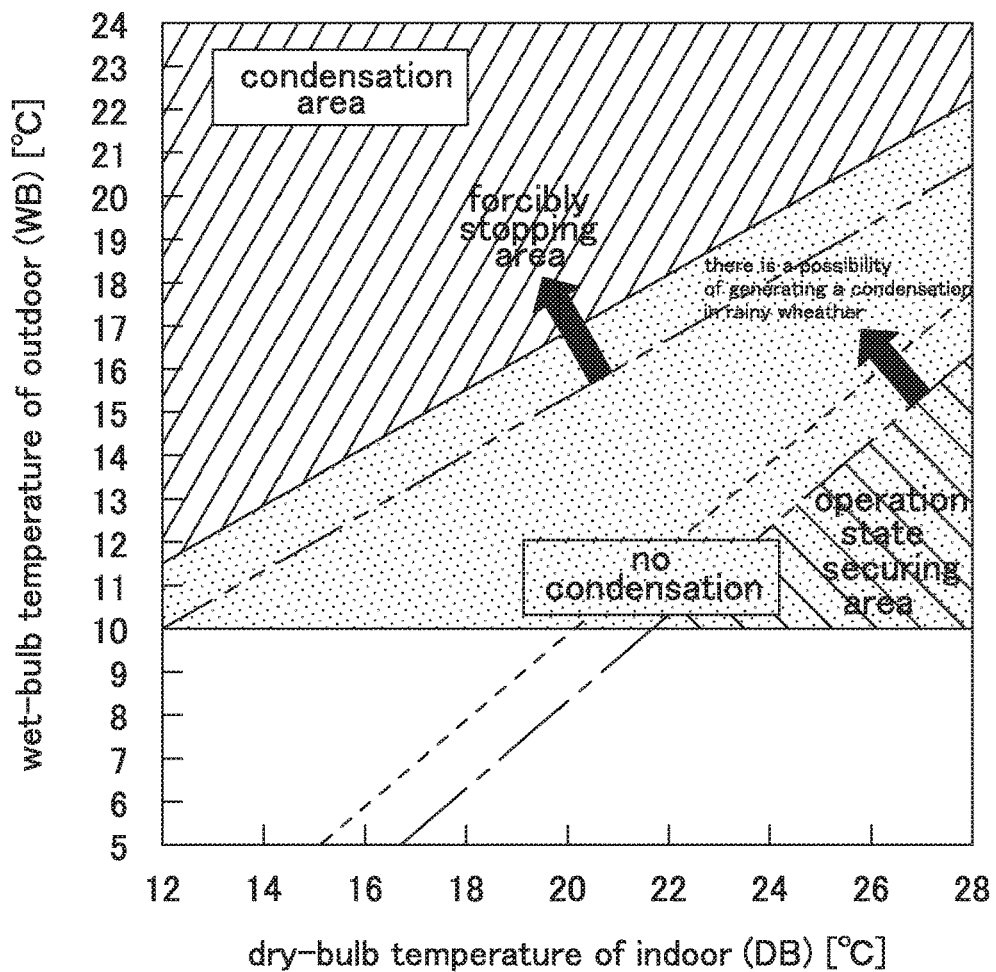
FIG. 17 is a graph showing operation situations in case that the speed of rotations of the compressor of the air conditioner in the second embodiment is minimum with 70% refrigerant filling rate.

In case that an air conditioner having 4 ton of refrigeration capacity and having refrigerant filling rate decreased to 70%, an operation situation with the speed of rotations of the compressor 21 maximum, an operation situation with the speed of rotations of the compressor 21 medium and an operation situation with the speed of rotations of the compressor 21 minimum are shown in the graph of FIG. 15, the graph of FIG. 16 and the graph of FIG. 17 respectively.

In each graph, a line which temperature of the liquid pipe is equal to outdoor temperature and a line which the predicted temperature of the liquid pipe is equal to outdoor temperature are confirmed by a test. In each graph, the axis of abscissas is a dry-bulb temperature (DB) degree Celsius scale of indoor, and the axis of ordinate is a wet-bulb temperature (WB) degree Celsius scale of outdoor. In each graph, each value is a value supposed that RH is 100%.

In these graphs, the line "temperature of the liquid pipe=outdoor temperature+1.5" corresponds to the border of above mentioned condition of the formula (1). In these example, instead of using the line of "the predicted temperature of the liquid pipe is equal to outdoor temperature", the line of "the predicted temperature of the liquid pipe is equal to outdoor temperature+1.5" is used as the border of the condition of the formula (2) in view of the individual difference occurred at the time of manufacture of the sensor and an accidental error of temperature sensing. Specifically, the example whose predetermined stopping condition includes a condition that the predicted temperature of refrigerant flowing in the liquid pipe is lower than a value obtained by adding a predetermined value (1.5) to the temperature detected by the outdoor air temperature sensor 54 (the second sensor) is used.

Each hutching area, with diagonal lines extending toward the lower left, in upper left area of each graph shows a condensation area which condensation actually generates. Each hutching area with dots in lower right area of each graph shows an area which condensation does not generate. Each hutching area, with diagonal lines extending toward the lower right, in lower right area of each graph shows an area which condensation does not generate, the area being that the forcibly stopping control of the compressor 21 is not carried out even in the situation that temperature of the liquid pipe is decrease by rain (In the area, it is possible to satisfy the condition of formula (1), but the condition of formula (2) is not satisfied.), and the area being that the heating operation is carried out certainly (operation state securing area). An area which is shown as "forcibly stopping area" with an arrow is an area which the compressor 21 is forcibly stopped by the satisfaction of the condition of formula (1) and the condition of formula (2). An area which the condition of formula (1) is satisfied but the condition of formula (2) is not satisfied and an area which the condition of formula (2) is satisfied but the condition of formula (1) is not satisfied are the area which the heating operation is carried out without performing the forcibly stopping control of the compressor 21 and which is treated as a no condensation area. An area which is shown as "there is a possibility of generating a condensation in rainy weather" with an arrow is an area which the condition of formula (2) is satisfied and the compressor 21 is forcibly stopped when the condition of formula (1) is further satisfied caused by decreasing of temperature of the liquid pipe by rain.

According to these graphs, it proved that the heating operation can be continued more continuously with avoiding the forcible stop of the compressor 21 as much as possible, because the predetermined stopping condition for the forcibly stopping control includes both the condition of formula (1) and the condition of formula (2).

(9) Modified Examples of the Second Embodiment (9-1)

The second embodiment is described with an example of a case where the predetermined stopping condition for the forcibly stopping control includes both the condition of formula (1) and the condition of formula (2).

However, the predetermined stopping condition for the forcibly stopping control includes the condition of formula (2) but may not include the condition of formula (1). Even in this case, the judgement of the predetermined stopping condition can be performed with the influence of the temperature changing by rain small.

Even in the case that the predetermined stopping condition for the forcibly stopping control includes the condition of formula (2) but may not include the condition of formula (1), the predetermined stopping condition may include a condition that the predetermined judging time has elapsed with the condition of the formula (2) satisfied (9-2)

The second embodiment is described with an example of a case where outdoor temperature is used in the condition of formula (1) and the condition of formula (2).

However, for example, ambient air temperature of the second indoor liquid side refrigerant pipe 45 (for example, indoor temperature) may be used in the condition of formula (1) and the condition of formula (2) instead of the outdoor temperature, in case the condensation at the second indoor liquid side refrigerant pipe 45 is tried to be suppressed.

(9-3)

The second embodiment is described with an example of a case where the value of the losing temperatures $\Delta T$ is stored in the outdoor storage section 20a or the indoor storage section 40a, and the control section 8 carries out the forcibly stopping control by using the stored information.

On the other hand, for example, the outdoor storage section 20a and/or the indoor storage section 40a may be composed of EEPROM and may be configured to change the stored value of the losing temperatures $\Delta T$ in the installation location.

(9-4)

The second embodiment is described with an example of a case where the control section 8 carries out the forcibly stopping control when the control section 8 determines that the predetermined stopping condition is satisfied.

On the other hand, for example, the control section 8 may be configured so that the forcibly stopping control is not carried out even with the satisfaction of the predetermined stopping condition in the installation location.

(9-5)

Figure 10:
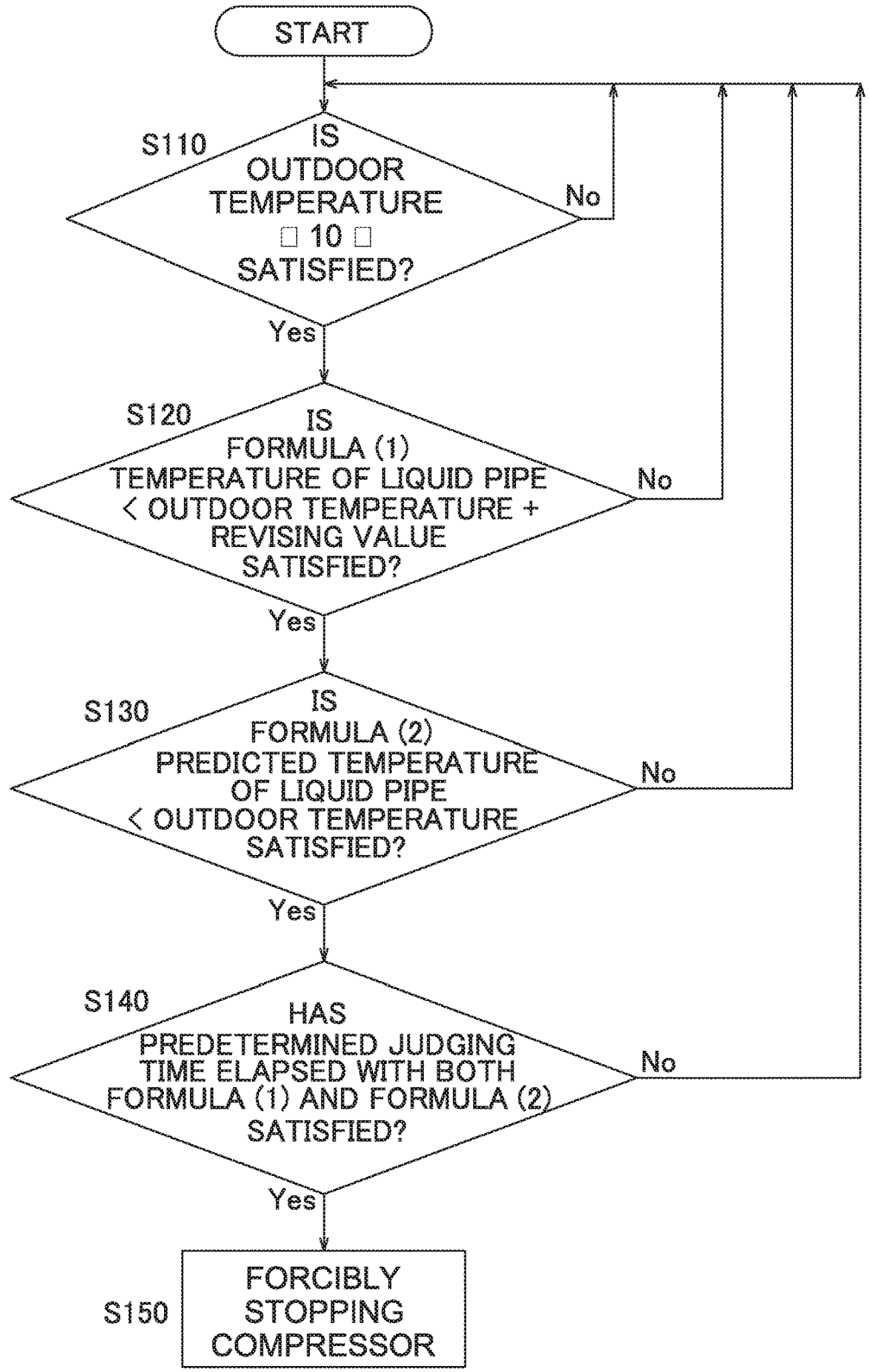
FIG. 10 is a control flow chart of a forcibly stopping control for the compressor of an air conditioner according to second embodiment.

The second embodiment is described with an example of a case where the determination of step S110, the determination of step S120 and the determination of step S130 is performed in this order as shown in the flow chart in FIG. 10.

However, the present invention is not limited to this, for example, the control section 8 may be configured so that these three conditions are determined simultaneously

What is claimed is:

1. An air conditioner comprising:
    a refrigerant circuit configured to perform at least a heating operation, the refrigerant circuit including
        an indoor unit having an indoor expansion valve and an indoor heat exchanger arranged therein, the indoor expansion valve having an opening degree that is controllable,
        an outdoor unit having an outdoor expansion valve, an outdoor heat exchanger, and a compressor arranged therein, and
        a connecting section which includes a connection pipe connecting the indoor expansion valve and the outdoor expansion valve on the liquid sides of the indoor heat exchanger and the outdoor heat exchanger;
    a first sensor arranged to detect a temperature of refrigerant flowing through the connection pipe; and
    a control section controlling at least the indoor expansion valve, the control section
        determining whether or not a predetermined condensate formation condition is satisfied based on a temperature or pressure of refrigerant flowing upstream of the outdoor expansion valve during a heating operation,
        performing a condensate formation suppressing control mode in a case when the control section determines that the predetermined condensate formation condition is satisfied, and
        performing a normal heating control mode performed in cases other than the case when the control section determines that the predetermined condensate formation condition is satisfied,
        during the normal heating control mode, the control section controlling the opening degree of the indoor expansion valve such that a degree of subcooling at an outlet of the indoor heat exchanger is maintained at a normal subcooling target value, and
        during the condensate formation suppressing control mode, the control section controlling the opening degree of the indoor expansion valve such that the degree of subcooling at the outlet of the indoor heat exchanger is maintained at a condensate formation suppressing subcooling target value smaller than the normal subcooling target value, the condensate formation suppressing subcooling target value being based on the temperature detected by the first sensor.

2. The air conditioner according to claim 1, further comprising:
    a second sensor arranged and configured to ascertain temperature of surroundings of the connection section, the control section further determining whether or not the predetermined condensate formation condition is satisfied based on information ascertained from the first sensor and the second sensor.

3. The air conditioner according to claim 2, wherein the connecting section has a portion extending outdoors, and
the second sensor is an outdoor air temperature sensor.

4. The air conditioner according to claim 1, wherein the first sensor is arranged and configured to ascertain the temperature of the refrigerant flowing upstream of the outdoor expansion valve during the heating operation, and
the control section further sets the condensate formation suppressing subcooling target value to be smaller as the temperature of refrigerant ascertained from the first sensor becomes lower.

5. The air conditioner according to claim 2, wherein the first sensor is arranged and configured to ascertain the temperature of the refrigerant flowing upstream of the outdoor expansion valve during the heating operation, and
the control section further sets the condensate formation suppressing subcooling target value to be smaller as the temperature of refrigerant ascertained from the first sensor decreases.

6. The air conditioner according to claim 3, wherein the first sensor is arranged and configured to ascertain the temperature of the refrigerant flowing upstream of the outdoor expansion valve during the heating operation,
the control section fully opens the indoor expansion valve in a case when the temperature of refrigerant ascertained from the first sensor is lower than a stop reference temperature when performing the condensate formation suppressing control mode, and
the stop reference temperature is obtained by adding a reference predetermined value to the outdoor air temperature ascertained from the second sensor.

7. The air conditioner according to claim 6, wherein the control section starts the normal heating control mode in a case when the temperature of refrigerant ascertained from the first sensor is higher than a return reference temperature,
the return reference temperature is obtained by adding a return predetermined value to the outdoor air temperature ascertained from the second sensor, and
the return predetermined value is larger than the reference predetermined value.

8. The air conditioner according to claim 5, wherein the control section fully opens the indoor expansion valve in a case when the temperature of refrigerant ascertained from the first sensor is lower than a stop reference temperature when performing the condensate formation suppressing control mode, and
the stop reference temperature is obtained by adding a reference predetermined value to the outdoor air temperature ascertained from the second sensor.

9. The air conditioner according to claim 8, wherein the control section starts the normal heating control mode in a case when the temperature of refrigerant ascertained from the first sensor is higher than a return reference temperature,
the return reference temperature is obtained by adding a return predetermined value to the outdoor air temperature ascertained from the second sensor, and
the return predetermined value is larger than the reference predetermined value.

10. The air conditioner according to claim 2, wherein
in the normal heating control mode, the control section further controls the opening degree of the outdoor expansion valve such that a degree of superheat of refrigerant suctioned into the compressor becomes a predetermined normal superheat target value.

11. The air conditioner according to claim 3, wherein
in the normal heating control mode, the control section further controls the opening degree of the outdoor expansion valve such that a degree of superheat of refrigerant suctioned into the compressor becomes a predetermined normal superheat target value.

12. The air conditioner according to claim 10, wherein
the first sensor is arranged and configured to ascertain the temperature of the refrigerant flowing upstream of the outdoor expansion valve during the heating operation, and
the control section further sets the condensate formation suppressing subcooling target value to be smaller as the temperature of refrigerant ascertained from the first sensor decreases.

13. The air conditioner according to claim 11, wherein
the first sensor is arranged and configured to ascertain the temperature of the refrigerant flowing upstream of the outdoor expansion valve during the heating operation, and
the control section further sets the condensate formation suppressing subcooling target value to be smaller as the temperature of refrigerant ascertained from the first sensor decreases.

14. The air conditioner according to claim 13, wherein
the control section fully opens the indoor expansion valve in a case when the temperature of refrigerant ascertained from the first sensor is lower than a stop reference temperature when performing the condensate formation suppressing control mode, and
the stop reference temperature is obtained by adding a reference predetermined value to the outdoor air temperature ascertained from the second sensor.

15. The air conditioner according to claim 14, wherein
the control section starts the normal heating control mode in a case when the temperature of refrigerant ascertained from the first sensor is higher than a return reference temperature,
the return reference temperature is obtained by adding a return predetermined value to the outdoor air temperature ascertained from the second sensor, and
the return predetermined value is larger than the reference predetermined value.

16. The air conditioner according to claim 2, further comprising:
a third sensor arranged and configured to ascertain a temperature of refrigerant flowing between the indoor heat exchanger and the indoor expansion valve,
the control section forcibly stops the compressor in a case when a predetermined stopping condition is satisfied,
the predetermined stopping condition includes a condition that a predicted temperature is lower than the temperature ascertained from the second sensor, the predicted temperature being obtained by subtracting a losing temperature from the temperature ascertained from the third sensor, and
the losing temperature is a temperature predetermined as a temperature that refrigerant theoretically loses while flowing
from a position where the third sensor is arranged between the indoor heat exchanger and the indoor expansion valve
to a position of the connecting section.

17. The air conditioner according to claim 6, further comprising:
a third sensor arranged and configured to ascertain a temperature of refrigerant flowing between the indoor heat exchanger and the indoor expansion valve,
the control section forcibly stops the compressor in a case when a predetermined stopping condition is satisfied,
the predetermined stopping condition includes a condition that a predicted temperature is lower than the temperature ascertained from the second sensor, the predicted temperature being obtained by subtracting a losing temperature from the temperature ascertained from the third sensor, and
the losing temperature is a temperature predetermined as a temperature that refrigerant theoretically loses while flowing
from a position where the third sensor is arranged between the indoor heat exchanger and the indoor expansion valve
to a position of the connecting section.

18. The air conditioner according to claim 16, wherein
the first sensor is arranged and configured to ascertain the temperature of the refrigerant flowing upstream of the outdoor expansion valve during the heating operation, and
the predetermined stopping condition includes a condition that the temperature of refrigerant ascertained from the first sensor is lower than a temperature obtained by adding a revising value to the temperature ascertained from the second sensor.

19. The air conditioner according to claim 16, wherein
the predetermined stopping condition further includes a condition that a state continues during a predetermined judging time, and
the state is that the predicted temperature is lower than the temperature ascertained from the second sensor.

20. The air conditioner according to claim 18, wherein
the predetermined stopping condition further includes a condition that a state continues during a predetermined judging time, and
the state is that
the predicted temperature is lower than the temperature ascertained from the second sensor, and
the temperature of refrigerant ascertained from the first sensor is lower than a temperature obtained by adding the revising value to the temperature ascertained from the second sensor.

21. An air conditioner comprising:
a refrigerant circuit configured to perform at least a heating operation, the refrigerant circuit including
an indoor unit having an indoor expansion valve and an indoor heat exchanger arranged therein, the indoor expansion valve having an opening degree that is controllable,
an outdoor unit having an outdoor expansion valve, an outdoor heat exchanger, and a compressor arranged therein, and
a connecting section which includes a connection pipe connecting the indoor expansion valve and the outdoor expansion valve;
a control section controlling at least the indoor expansion valve, the control section having a condensate formation suppressing control mode performed in a case when a predetermined condensate formation condition is satisfied, the predetermined condensate formation condition being determined based on a temperature or pressure of refrigerant flowing upstream of the outdoor expansion valve during a heating operation, and performing a normal heating control mode performed in cases other than the case when the predetermined condensate formation condition is satisfied, the control section increasing the opening degree of the indoor expansion valve when the condensate formation suppressing control mode is performed compared to a case when the normal heating control mode is performed;

a first sensor arranged and configured to ascertain the temperature or pressure of the refrigerant flowing upstream of the outdoor expansion valve during the heating operation;

a second sensor arranged and configured to ascertain temperature of surroundings of the connection section;

a third sensor arranged and configured to ascertain a temperature of refrigerant flowing between the indoor heat exchanger and the indoor expansion valve; and a memory;

the control section further determining whether or not the predetermined condensate formation condition is satisfied based on information ascertained from the first sensor and the second sensor, the control section forcibly stopping the compressor in a case when a predetermined stopping condition is satisfied, the predetermined stopping condition including a condition that a predicted temperature is lower than the temperature ascertained from the second sensor, the predicted temperature being obtained by subtracting a losing temperature stored in the memory from the temperature ascertained from the third sensor, and the losing temperature being a temperature predetermined as a temperature that refrigerant theoretically loses while flowing from a position where the third sensor is arranged between the indoor heat exchanger and the indoor expansion valve to a position of the connecting section, the losing temperature being stored in the memory, the control section further determining whether the predetermined stopping condition is satisfied by using the losing temperature, where the losing temperature depends on the speed of rotations of the compressor at a moment of the determining.

* * * * *